United States Patent
Bi et al.

(10) Patent No.: US 12,022,417 B2
(45) Date of Patent: Jun. 25, 2024

(54) UPLINK SIGNAL TRANSMISSION BASED ON TIMING ADVANCE ADJUSTMENT

(71) Applicant: Huawei Technologies Co., Ltd., Shenzhen (CN)

(72) Inventors: Wenping Bi, Shenzhen (CN); Yue Zhao, Beijing (CN); Xinqian Xie, Beijing (CN); Hong Wang, Beijing (CN); Zheng Yu, Beijing (CN); Xingqing Cheng, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 611 days.

(21) Appl. No.: 17/215,999

(22) Filed: Mar. 29, 2021

(65) Prior Publication Data

US 2021/0289463 A1 Sep. 16, 2021

Related U.S. Application Data

(63) Continuation of application No. PCT/CN2018/108437, filed on Sep. 28, 2018.

(51) Int. Cl.
*H04W 56/00* (2009.01)
*H04B 17/318* (2015.01)
(Continued)

(52) U.S. Cl.
CPC ...... *H04W 56/0045* (2013.01); *H04B 17/318* (2015.01); *H04L 5/0051* (2013.01); *H04W 24/10* (2013.01); *H04W 74/0833* (2013.01)

(58) Field of Classification Search
CPC ............ H04W 56/0045; H04W 24/10; H04W 74/0833; H04W 74/08; H04W 56/00;
(Continued)

(56) References Cited

U.S. PATENT DOCUMENTS 11,050,599 B2 * 6/2021 Zhang et al. ....... H04L 27/2678
2012/0014371 A1 * 1/2012 Weng et al. ................... 370/350
(Continued)

FOREIGN PATENT DOCUMENTS

CA 3114770 A1 11/2017
CN 101296024 A 10/2008
(Continued)

OTHER PUBLICATIONS

Zhou et al., (CN 102958075 A) >>> Method and Device for Determining Timing Advance TA (see title) (Year: 2013).*
(Continued)

*Primary Examiner* — Meless N Zewdu
(74) *Attorney, Agent, or Firm* — Leydig, Voit & Mayer, Ltd.

(57) ABSTRACT

An uplink signal transmission method includes: sending, by a terminal device, an uplink signal to a network device in response to determining that a first variation meets a timing advance (TA) update condition, where the first variation indicates a quality change value of a downlink signal received by the terminal device; receiving, by the terminal device, first information from the network device; and in response to determining that the first information includes TA information, adjusting, by the terminal device, an uplink transmission time based on the TA information.

16 Claims, 7 Drawing Sheets

(51) Int. Cl.
*H04L 5/00* (2006.01)
*H04W 24/10* (2009.01)
*H04W 74/0833* (2024.01)

(58) Field of Classification Search
CPC . H04W 56/0005; H04W 72/21; H04W 72/23; H04W 74/002; H04W 74/006; H04W 74/004; H04W 52/143; H04W 52/146; H04W 56/0095; H04W 48/12; H04W 36/302; H04W 52/245; H04W 74/00; H04L 5/00; H04L 5/0051; H04L 25/03955; H04B 17/318
See application file for complete search history.

(56) References Cited

U.S. PATENT DOCUMENTS

| | | | | |
|---|---|---|---|---|
| 2013/0188533 | A1* | 7/2013 | He et al. | H04J 3/1605 |
| 2013/0203447 | A1* | 8/2013 | Hannan et al. | 455/456.5 |
| 2013/0235858 | A1 | 9/2013 | Zhao et al. | |
| 2013/0258958 | A1* | 10/2013 | Dinan | H04W 56/001 |
| 2013/0258959 | A1* | 10/2013 | Dinan | H04W 56/00 |
| 2014/0169316 | A1* | 6/2014 | Kim et al. | H04L 5/0053 |
| 2015/0085768 | A1 | 3/2015 | Lunden et al. | |
| 2015/0326373 | A1* | 11/2015 | Ryu et al. | H04L 5/0073 |
| 2018/0124724 | A1* | 5/2018 | Tsai et al. | H04W 56/0005 |
| 2019/0174571 | A1 | 6/2019 | Deenoo et al. | |

FOREIGN PATENT DOCUMENTS

| | | | | |
|---|---|---|---|---|
| CN | 102932837 | A | 2/2013 | |
| CN | 105188128 | A | 12/2015 | |
| CN | 107105496 | A | 8/2017 | |
| TW | 201822559 | A | 6/2018 | |
| WO | WO 2014117372 | A1 * | 2/2013 | H04W 24/10 |
| WO | 2015150374 | A1 | 10/2015 | |

OTHER PUBLICATIONS

Chen, Li (Cn 107105496 A) >>> A Method for Obtaining, Returns the Uplink Timing Advance Amount of Method and Device and System (see title). (Year: 2017).*

Liu et al. (WO 2018028340 A1) >>> Processing Method and Apparatus for Tracking UE in Low Power Consumption Mode (see title). (Year: 2018).*

Liu, et al. (CN 108307495 A) >>> Method and Apparatus for Tracking Processing of the UE Under the Low Power Consumption Mode (see title) (Year: 2018).*

CN 105164950 A) >>> Transmitting Uplink Data Using a Plurality of Serving Cell Method and Apparatus (see title) (Year: 2015).*

CN 110809904 A) >>> Method and Apparatus for a Vehicle Radio Communication (title); a communication processor configured to send timing advance is controlled according to the timing of the target device, timing advance determiner is configured to perform timing advance update, estimator (description) (Year: 2020).*

Nokia, "Serving Cell TA Estimation for Multilateration Positioning," 3GPP TSG RAN WG6 #3, Athens, Greece, R6-170045, Agenda item 6.1.1, total 7 pages, 3rd Generation Partnership Project, Valbonne, France (Feb. 13-17, 2017).

"Further discussion on RRM impact on shortened TTI and reduced processing," 3GPP TSG-RAN WG4 Meeting #82, R4-1701435, Huawei, HiSilicon, Athens, Greece, total 5 pages, 3rd Generation Partnership Project, Valbonne, France (Feb. 13-17, 2017).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.2.0, total 357 pages, 3rd Generation Partnership Project, Valbonne, France (Jun. 2018).

"3rd Generation Partnership Project; Technical Specification Group Radio Access Network; Evolved Universal Terrestrial Radio Access (E-UTRA); Medium Access Control (MAC) protocol specification (Release 15)," 3GPP TS 36.321 V15.2.0, total 126 pages, 3rd Generation Partnership Project, Valbonne, France (Jul. 2018).

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331 V13.11.0, total 645 pages, 3rd Generation Partnership Project, Valbonne, France (Sep. 2018).

"UL transmission in preconfigured resource," 3GPP TSG RAN WG1 Meeting #94, R1-1808118, Huawei, HiSilicon, Gothenburg, total 5 pages, 3rd Generation Partnership Project, Valbonne, France (Aug. 20-24, 2018).

"LTE-M Preconfigured UL Resources Summary," 3GPP TSG RAN WG1 Meeting 94, R1-1809528, Sierra Wireless, Gothenburg, Sweden, total 4 pages, 3rd Generation Partnership Project, Valbonne, France (Aug. 20-24, 2018).

"3rd Generation Partnership Project; Technical Specification Group Radio Access Network; Evolved Universal Terrestrial Radio Access (E-UTRA); Physical layer procedures (Release 15)," 3GPP TS 36.213 V15.2.0, total 541 pages, 3rd Generation Partnership Project, Valbonne, France (Jun. 2018).

* cited by examiner

UPLINK SIGNAL TRANSMISSION BASED ON TIMING ADVANCE ADJUSTMENT

CROSS-REFERENCE TO RELATED APPLICATIONS

This application is a continuation of International Application No. PCT/CN2018/108437, filed on Sep. 28, 2018, the disclosure of which is hereby incorporated by reference in its entirety.

FIELD

Embodiments of this application relate to the communications field, and in particular, to an uplink signal transmission method and a device.

BACKGROUND

Currently, large-scale application and deployment of wireless communications systems can provide various types of communication, for example, voice, data, and multimedia services, for a plurality of users.

In a current discussion process of a long term evolution (LTE) technology, a current LTE system can support a machine type communication (MTC) service.

In the LTE system, user equipment (UE) that can support the MTC service is bandwidth-reduced low-complexity (BL) UE or coverage enhancement (CE) UE.

A connection state of the UE may be an idle state, an inactive state, or a connected state. UE in the connected state may directly communicate with a base station and transmit data. UE in the idle state cannot directly transmit data, and needs to perform random access and establish a radio resource control (RRC) connection before transmitting data. The inactive state may be considered as an intermediate state between the two states. A user and a core network retain a context of an RRC message in the connected state. Therefore, the UE can enter the connected state at a faster speed than UE in the idle state.

In an uplink transmission process of UE, to transmit a data packet of the UE to a base station side at a time expected by a base station, the base station needs to estimate a radio frequency transmission delay caused by a distance. To ensure time synchronization on the base station side, the UE sends the data packet in advance by a period of time based on a timing advance (TA), so that the base station can receive the data packet at the expected moment.

A current technology provides a TA adjustment method: when UE is in a connected state, a timer is maintained on a UE side, and no uplink signal is transmitted before the timer expires. When the timer expires, the UE updates a TA by sending a preamble.

The foregoing current technology is applicable to UE in a connected state, and is not applicable to UE in an idle state. According to the current technology, when UE is in an idle state, no timer is maintained in the UE, uplink transmission of the UE is discontinuous, and adjacent transmission is performed at a relatively long time. Therefore, a TA value may be outdated or inapplicable.

SUMMARY

Embodiments of this application provide an uplink signal transmission method and a device, so that a terminal device can adjust an uplink transmission time.

According to a first aspect, an embodiment of this application provides an uplink signal transmission method, including: sending, by a terminal device, an uplink signal to a network device when the terminal device determines that a first variation meets a timing advance (TA) update condition, where the first variation is used to indicate a quality change value of a downlink signal received by the terminal device, a strength change value of the downlink signal, and/or a location change value of the terminal device; receiving, by the terminal device, first information sent by the network device; and when the first information includes TA information, adjusting, by the terminal device, an uplink transmission time based on the TA information.

In the foregoing embodiment of this application, when the terminal device determines that the first variation meets the TA update condition, the terminal device first sends the uplink signal to the network device, where the first variation is used to indicate the quality change value of the downlink signal received by the terminal device, the strength change value of the downlink signal, and/or the location change value of the terminal device. The terminal device receives the first information sent by the network device. When the first information includes the TA information, the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

In an exemplary implementation of the first aspect, that the terminal device determines that a first variation meets a timing advance (TA) update condition includes: the terminal device determines that the first variation is greater than a first threshold and the first variation is less than a second threshold, where the first threshold is less than the second threshold. The TA update condition is: the first variation is greater than the first threshold, and the first variation is less than the second threshold. Therefore, after generating the first variation, the terminal device compares a value of the first variation with the first threshold and the second threshold. The first threshold and the second threshold are two different thresholds, and values of the first threshold and the second threshold may be determined according to an actual communication transmission scenario. When it is determined that the first variation is greater than the first threshold and less than the second threshold, it indicates that quality or strength of the downlink signal changes relatively slightly or that a user location does not change much. In this case, the terminal device may send the uplink signal to update a TA, where the uplink signal is user-specific, carries a user identity, or is scrambled by a user identity. Therefore, the network device may complete TA update without initiating a random access procedure, to ensure TA validity and avoid interference to other users.

In an exemplary implementation of the first aspect, the sending, by a terminal device, an uplink signal to a network device includes: sending, by the terminal device, a demodulation reference signal (DMRS) to the network device. That the terminal device sends a DMRS is used as an example. When the terminal device is in an idle state, time-frequency resources allocated by the network device to different terminal devices may be the same, or may be different. However, DMRSs of different terminal devices need to be orthogonal, for example, may be distinguished by using time-frequency resources, cyclic shifts, or root sequences, and the DMRSs are user-specific. Therefore, the network device may distinguish between different terminal devices by using detected DMRSs. When the first variation is between the first threshold and the second threshold, the terminal device may send a DMRS, and the network device performs uplink synchronization measurement based on the received DMRS, to obtain the TA information.

In an exemplary implementation of the first aspect, when the first information includes indication information, the method further includes: determining, by the terminal device based on the indication information, that the terminal device does not send an uplink data signal on a resource preconfigured by the network device; sending, by the terminal device, a random access request to the network device based on the indication information; or determining, by the terminal device based on the indication information, that the terminal device sends an uplink data signal in an early data transmission manner. The indication information is used to indicate that the terminal device does not send the uplink data signal on the resource preconfigured by the network device. That is, the preconfigured resource cannot be used to send the uplink data signal, to avoid interference to other terminal devices. Based on the indication information of the network device, the terminal device may initiate the random access request, or send the uplink data signal in the early data transmission manner. The random access request is a random access request in a non-early data transmission manner. A preamble of the random access request may be determined by the terminal device based on a configuration of the network device, or a preamble used for the random access request may be configured by the network device for the terminal device, and the preamble is not shared with another user on a same time-frequency resource. Therefore, different users can be distinguished.

In an exemplary implementation of the first aspect, the sending, by a terminal device, an uplink signal to a network device when the terminal device determines that a first variation meets a timing advance (TA) update condition includes: sending, by the terminal device, a random access request to the network device when the terminal device determines that the first variation is greater than the second threshold. When it is determined that the first variation is greater than the second threshold, it indicates that the quality or the strength of the downlink signal changes relatively greatly, or the user location changes relatively greatly. If the terminal device sends a DMRS, relatively strong interference is caused to other users. Therefore, a TA value needs to be changed by transmitting a preamble. In this case, the terminal device may send the random access request to the network device, so that the terminal device obtains a valid TA value, and interference to other users caused by an inappropriate TA value is effectively avoided.

In an exemplary implementation of the first aspect, the sending, by a terminal device, an uplink signal to a network device when the terminal device determines that a first variation meets a timing advance (TA) update condition includes: when the terminal device determines that the first variation is greater than a third threshold, sending, by the terminal device, a DMRS to the network device, or sending, by the terminal device, a random access request to the network device. In the foregoing embodiment of this application, when the terminal device determines that the first variation is greater than the third threshold, it indicates that quality or strength of the downlink signal has changed greatly, or a location of the terminal device may change relatively significantly. The terminal device may send the DMRS or the random access request, so that the network device may receive the DMRS or the random access request. The network device identifies the terminal device by using the DMRS or the random access request, and the network device may send the TA information to the terminal device. In this way, the terminal device can update a TA value, to ensure validity of the TA value, avoid interference to other users, and further, can effectively reduce power consumption of a user and reduce a TA obtaining delay of the user.

In an exemplary implementation of the first aspect, when the first information includes indication information, the method further includes: determining, by the terminal device based on the indication information, that the terminal device does not send an uplink data signal on a resource preconfigured by the network device. The indication information is used to indicate that the terminal device does not send the uplink data signal on the resource preconfigured by the network device. That is, the preconfigured resource cannot be used to send the uplink data signal, to avoid interference to other terminal devices.

In an exemplary implementation of the first aspect, the method further includes: when the terminal device determines that the first variation does not meet the TA update condition and that a timer configured by the terminal device expires, sending, by the terminal device, a DMRS to the network device, or sending, by the terminal device to the network device, a random access request that carries a first preamble, where the first preamble is a preamble configured by the network device for the terminal device. The preamble configured by the network device is a specific preamble configured by the network device for the terminal device, and the preamble is not shared with another terminal device on a same time-frequency resource. When the timer of the terminal device expires, it indicates that the TA value of the terminal device may have become invalid. In this case, the terminal device may send the DMRS or the random access request to the network device, so that the terminal device obtains a valid TA value, and interference to other users caused by an inappropriate TA value is effectively avoided.

In an exemplary implementation of the first aspect, the strength change value of the downlink signal includes a change value of reference signal received power (RSRP) of the terminal device; and the quality change value of the downlink signal includes a change value of reference signal received quality (RSRQ) of the terminal device. When the network device sends the downlink signal to the terminal device, the terminal device may detect the RSRP within a period of time, and determine the change value of the RSRP as the strength change value of the downlink signal. In an actual application, in addition to using the change value of the RSRP as the strength change value of the downlink signal, a value of the RSRP may further be calculated, for example, calculated by using an equivalent or variant formula, to obtain a result as the strength change value of the downlink signal. The terminal device may detect the RSRQ within a period of time, and determine the change value of the RSRQ as the quality change value of the downlink signal. In an actual application, in addition to using the change value of the RSRQ as the quality change value of the downlink signal, a value of the RSRQ may further be calculated, for example, calculated by using an equivalent or variant formula, to obtain a result as the quality change value of the downlink signal.

According to a second aspect, an embodiment of this application further provides an uplink signal transmission method, including: receiving, by a network device, an uplink signal sent by a terminal device when a first variation meets a timing advance (TA) update condition, where the first variation is used to indicate a quality change value of a downlink signal received by the terminal device, a strength change value of the downlink signal, and/or a location change value of the terminal device; generating, by the network device, first information based on the uplink signal, where when the network device determines that TA information can be generated, the first information includes the TA information, and the TA information is used to indicate the terminal device to adjust an uplink transmission time; and sending, by the network device, the first information to the terminal device.

In this embodiment of this application, when the terminal device determines that the first variation meets the TA update condition, the terminal device first sends the uplink signal to the network device, where the first variation is used to indicate the quality change value of the downlink signal received by the terminal device, the strength change value of the downlink signal, and/or the location change value of the terminal device. The terminal device receives the first information sent by the network device. When the first information includes the TA information, the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

In an exemplary implementation of the second aspect, the receiving, by a network device, an uplink signal sent by a terminal device when a first variation meets a timing advance (TA) update condition includes: receiving, by the network device, a demodulation reference signal (DMRS) sent by the terminal device; or receiving, by the network device, a random access request sent by the terminal device.

In an exemplary implementation of the second aspect, when the network device determines that the TA information cannot be generated, the first information includes indication information, and the indication information is used to indicate the terminal device not to send an uplink data signal on a resource preconfigured by the network device, indicate the terminal device to send a random access request, or indicate the terminal device to send an uplink data signal in an early data transmission manner. The indication information is used to indicate that the terminal device does not send the uplink data signal on the resource preconfigured by the network device. That is, the preconfigured resource cannot be used to send the uplink data signal, to avoid interference to other terminal devices. Based on the indication information of the network device, the terminal device may initiate the random access request, or send the uplink data signal in the early data transmission manner. The random access request is a random access request in a non-early data transmission manner. A preamble of the random access request may be determined by the terminal device based on a configuration of the network device, or a preamble used for the random access request may be configured by the network device for the terminal device, and the preamble is not shared with another user on a same time-frequency resource. Therefore, different users can be distinguished.

According to a third aspect, an embodiment of this application provides an uplink signal transmission method, including: periodically sending, by a terminal device, a demodulation reference signal (DMRS) to a network device, or periodically sending, by a terminal device, a random access request to a network device; receiving, by the terminal device, first information sent by the network device; and when the first information includes timing advance TA information, adjusting, by the terminal device, an uplink transmission time based on the TA information.

In this embodiment of this application, the terminal device periodically sends the DMRS or the random access request to the network device, and the terminal device receives the first information sent by the network device. When the first information includes the TA information, the terminal device adjusts the uplink transmission time based on the TA information. In this embodiment of this application, the terminal device may periodically send the DMRS or the random access request, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

In an exemplary implementation, the random access request includes a preamble configured by the network device.

In an exemplary implementation, when the terminal device sends a DMRS, and the first information includes indication information, the method further includes:
    sending, by the terminal device, a random access request to the network device based on the indication information.

According to a fourth aspect, an embodiment of this application provides an uplink signal transmission method, including: receiving, by a network device, a demodulation reference signal (DMRS) or a random access request periodically sent by a terminal device; generating, by the network device, first information based on the DMRS or the random access request, where when the network device determines that timing advance TA information can be generated, the first information includes the TA information, and the TA information is used to indicate the terminal device to adjust an uplink transmission time; and sending, by the network device, the first information to the terminal device.

In this embodiment of this application, the terminal device periodically sends the DMRS or the random access request to the network device, and the terminal device receives the first information sent by the network device. When the first information includes the TA information, the terminal device adjusts the uplink transmission time based on the TA information. In this embodiment of this application, the terminal device may periodically send the DMRS or the random access request, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

In an exemplary implementation, the random access request includes a preamble configured by the network device.

In an exemplary implementation, when the terminal device sends a DMRS, the first information includes indication information, and the indication information is used to indicate the terminal device to send a random access request to the network device.

According to a fifth aspect, an embodiment of this application provides an uplink signal transmission method, including: sending, by a terminal device, a demodulation reference signal (DMRS) to a network device when the terminal device determines that a first variation meets a timing advance (TA) update condition, where the first variation is used to indicate a quality change value of a downlink signal received by the terminal device, a strength change value of the downlink signal, and/or a location change value of the terminal device; receiving, by the terminal device, TA information sent by the network device; and adjusting, by the terminal device, an uplink transmission time based on the TA information.

In the foregoing embodiment of this application, when the terminal device determines that the first variation meets the TA update condition, the terminal device first sends the DMRS to the network device, where the first variation is used to indicate the quality change value of the downlink signal received by the terminal device, the strength change value of the downlink signal, and/or the location change value of the terminal device. The terminal device receives the TA information sent by the network device, and the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

According to a sixth aspect, an embodiment of this application provides an uplink signal transmission method, including: receiving, by a network device, a demodulation reference signal (DMRS) sent by a terminal device when a first variation meets a timing advance (TA) update condition, where the first variation is used to indicate a quality change value of a downlink signal received by the terminal device, a strength change value of the downlink signal, and/or a location change value of the terminal device; generating, by the network device, TA information based on the DMRS, where the TA information is used to indicate the terminal device to adjust an uplink transmission time; and sending, by the network device, the TA information to the terminal device.

In the foregoing embodiment of this application, when the terminal device determines that the first variation meets the TA update condition, the terminal device first sends the DMRS to the network device, where the first variation is used to indicate the quality change value of the downlink signal received by the terminal device, the strength change value of the downlink signal, and/or the location change value of the terminal device. The terminal device receives the TA information sent by the network device, and the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

According to a seventh aspect, an embodiment of this application provides an uplink signal transmission method, including: when a terminal device determines that a timer of the terminal device expires, sending, by the terminal device, a demodulation reference signal (DMRS) to a network device, or sending, by the terminal device, a random access request to a network device; receiving, by the terminal device, first information sent by the network device; and when the first information includes timing advance TA information, adjusting, by the terminal device, an uplink transmission time based on the TA information.

In the foregoing embodiment of this application, the terminal device sends the DMRS or the random access request to the network device when the timer expires, and the terminal device receives the first information sent by the network device. When the first information includes the TA information, the terminal device adjusts the uplink transmission time based on the TA information. In this embodiment of this application, the terminal device may send the DMRS or the random access request at a fixed time when the timer expires, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

In an exemplary implementation, the random access request includes a preamble configured by the network device.

According to an eighth aspect, an embodiment of this application provides an uplink signal transmission method, including: receiving, by a network device, a demodulation reference signal (DMRS) or a random access request sent by a terminal device when a timer expires; generating, by the network device, first information based on the DMRS or the random access request, where when the network device determines that timing advance TA information can be generated, the first information includes the TA information, and the TA information is used to indicate the terminal device to adjust an uplink transmission time; and sending, by the network device, the first information to the terminal device.

In the foregoing embodiment of this application, the terminal device sends the DMRS or the random access request to the network device when the timer expires, and the terminal device receives the first information sent by the network device. When the first information includes the TA information, the terminal device adjusts the uplink transmission time based on the TA information. In this embodiment of this application, the terminal device may send the DMRS or the random access request at a fixed time when the timer expires, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

In an exemplary implementation, the random access request includes a preamble configured by the network device.

In an exemplary implementation, when the terminal device sends a DMRS, the first information includes indication information, and the indication information is used to indicate the terminal device to send a random access request to the network device.

According to a ninth aspect, an embodiment of this application provides a terminal device, including: a processing module, configured to send an uplink signal to a network device by using a sending module when determining that a first variation meets a timing advance (TA) update condition, where the first variation is used to indicate a quality change value of a downlink signal received by the terminal device, a strength change value of the downlink signal, and/or a location change value of the terminal device; and a receiving module, configured to receive first information sent by the network device, where the processing module is further configured to: when the first information includes TA information, adjust an uplink transmission time based on the TA information.

In an exemplary implementation of the ninth aspect, that a first variation meets a timing advance (TA) update condition includes: the first variation is greater than a first threshold and the first variation is less than a second threshold, where the first threshold is less than the second threshold.

In an exemplary implementation of the ninth aspect, the uplink signal is a demodulation reference signal (DMRS).

In an exemplary implementation of the ninth aspect, when the first information includes indication information, the processing module is further configured to: determine, based on the indication information, that the terminal device does not send an uplink data signal on a resource preconfigured by the network device; send a random access request to the network device based on the indication information by using the sending module; or determine, based on the indication information, that the terminal device sends an uplink data signal by using the sending module in an early data transmission manner.

In an exemplary implementation of the ninth aspect, the processing module is further configured to send a random access request to the network device by using the sending module when determining that the first variation is greater than the second threshold.

In an exemplary implementation of the ninth aspect, that a first variation meets a timing advance (TA) update condition includes that the first variation is greater than a third threshold; and the uplink signal is a DMRS or a random access request.

In an exemplary implementation of the ninth aspect, the processing module is further configured to: when the first information includes indication information, determine, based on the indication information, that the terminal device does not send an uplink data signal on a resource preconfigured by the network device.

In an exemplary implementation of the ninth aspect, the processing module is further configured to: when determining that the first variation does not meet the TA update condition and that a timer configured by the terminal device expires, send, by using the sending module, a DMRS to the network device, or send, to the network device by using the sending module, a random access request that carries a first preamble, where the first preamble is a preamble configured by the network device for the terminal device.

In an exemplary implementation of the ninth aspect, the strength change value of the downlink signal includes a change value of reference signal received power (RSRP) of the terminal device; and the quality change value of the downlink signal includes a change value of reference signal received quality (RSRQ) of the terminal device.

In the ninth aspect of this application, the composition modules of the terminal device may further perform the steps described in the first aspect and the possible implementations thereof. For details, refer to the descriptions in the first aspect and the possible implementations thereof.

According to a tenth aspect, an embodiment of this application provides a network device, including: a receiving module, configured to receive an uplink signal sent by a terminal device when a first variation meets a timing advance (TA) update condition, where the first variation is used to indicate a quality change value of a downlink signal received by the terminal device, a strength change value of the downlink signal, and/or a location change value of the terminal device; a processing module, configured to generate first information based on the uplink signal, where when the processing module determines that TA information can be generated, the first information includes the TA information, and the TA information is used to indicate the terminal device to adjust an uplink transmission time; and a sending module, configured to send the first information to the terminal device.

In an exemplary implementation of the tenth aspect, the receiving module is configured to: receive a demodulation reference signal (DMRS) sent by the terminal device; or receive a random access request sent by the terminal device.

In an exemplary implementation of the tenth aspect, when the processing module determines that the TA information cannot be generated, the first information includes indication information, and the indication information is used to indicate the terminal device not to send an uplink data signal on a resource preconfigured by the network device, indicate the terminal device to send a random access request, or indicate the terminal device to send an uplink data signal in an early data transmission manner.

In the tenth aspect of this application, the composition modules of the network device may further perform the steps described in the second aspect and the possible implementations thereof. For details, refer to the descriptions in the second aspect and the possible implementations thereof.

According to an eleventh aspect, an embodiment of this application provides a computer-readable storage medium. The computer-readable storage medium stores instructions. When the instructions are run on a computer, the computer is enabled to perform the methods according to the first to the eighth aspects.

According to a twelfth aspect, an embodiment of this application provides a computer program product including instructions. When the instructions are run on a computer, the computer is enabled to perform the methods according to the first to the eighth aspects.

According to a thirteenth aspect, an embodiment of this application provides a communications apparatus. The communications apparatus may include an entity such as a terminal device, a network device, or a chip. The communications apparatus includes a processor and a memory. The memory is configured to store instructions. The processor is configured to execute the instructions in the memory, to enable the communications apparatus to perform the method according to any one of the first to the eighth aspects.

According to a fourteenth aspect, this application provides a chip system. The chip system includes a processor, configured to support a terminal device or a network device in implementing a function in the first to the eighth aspects, for example, sending or processing data and/or information in the foregoing methods. In an exemplary design, the chip system further includes a memory, where the memory is configured to store program instructions and data of the terminal device or the network device. The chip system may include a chip, or may include a chip and another discrete component.

DETAILED DESCRIPTION

Figure 1:
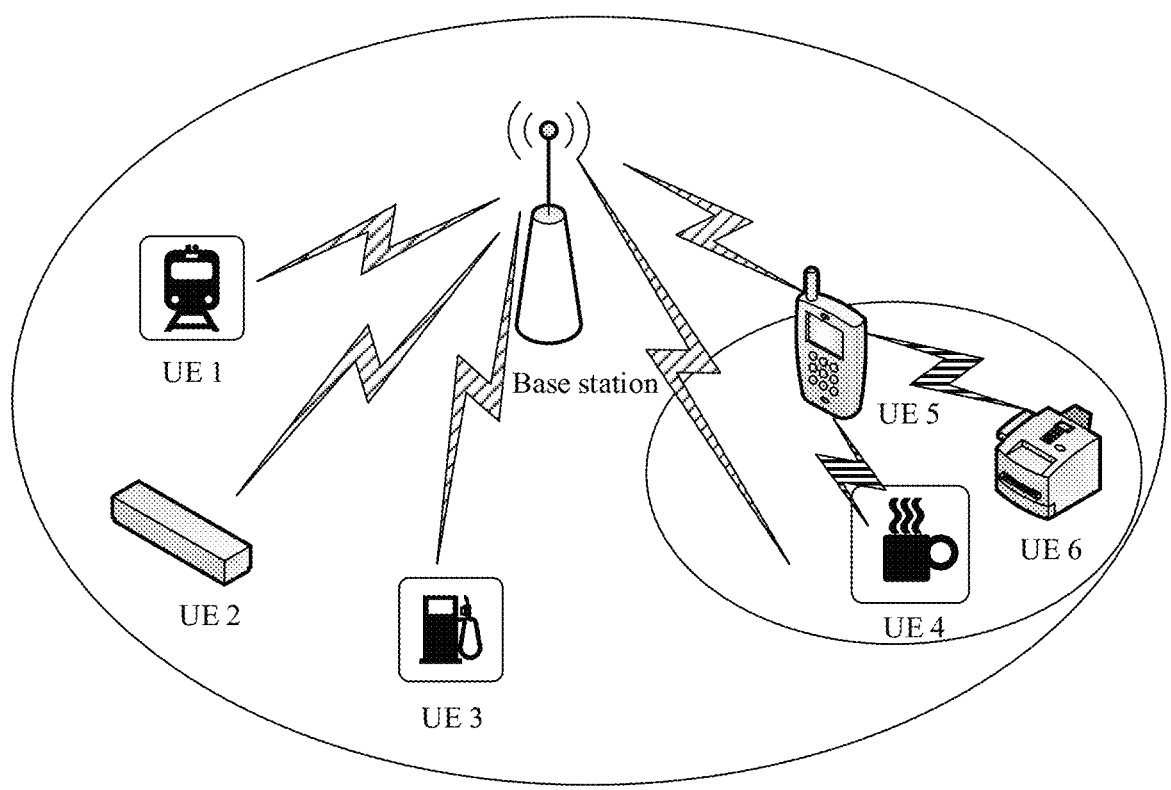
FIG. 1 is a schematic diagram of a system architecture to which an uplink signal transmission method is applied according to an exemplary embodiment of this application.

Embodiments of this application provide an uplink signal transmission method and a device, so that a terminal device can adjust an uplink transmission time.

The following describes the embodiments of this application with reference to the accompanying drawings.

In this specification, claims, and the accompanying drawings of this application, the terms "first", "second", and the like are intended to distinguish between similar objects but do not necessarily indicate a specific order or sequence. It should be understood that the terms used in such a way are interchangeable in a proper circumstance, which is merely a discrimination manner that is used when objects having a same attribute are described in the embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, system, product, or device.

Technical solutions in the embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single carrier frequency division multiple access (SC-FDMA) system, and another system. The terms "system" and "network" can be interchanged with each other. The CDMA system may implement wireless technologies such as universal radio terrestrial access (UTRA) and CDMA2000. The UTRA may include a wideband CDMA (WCDMA) technology and other variant technologies of CDMA. The CDMA2000 may cover the interim standard (IS) 2000 (IS-2000), the IS-95 standard, and the IS-856 standard. The TDMA system can implement wireless technologies such as global system for mobile communications (GSM). The OFDMA system can implement wireless technologies such as evolved universal terrestrial radio access (E-UTRA), ultra mobile broadband (UMB), IEEE 802.11 (Wi-Fi), IEEE 802.16 (WiMAX), IEEE 802.20, and flash OFDMA. The UTRA corresponds to UMTS, and the E-UTRA corresponds to an evolved version of the UMTS. In 3GPP, long term evolution (LTE) and various versions evolved based on the LTE are new UMTS versions using the E-UTRA. A 5th generation (5 Generation, "5G" for short) communications system or new radio (New Radio, "NR" for short) is a next generation communications system under study. In addition, the communications system is further applicable to a future-oriented communications technology, and is applicable to the technical solutions provided in the embodiments of this application. The system architecture and the service scenario described in the embodiments of this application are intended to describe the technical solutions in the embodiments of this application more clearly, and do not constitute a limitation on the technical solutions provided in the embodiments of this application. A person of ordinary skill in the art may know that the technical solutions provided in the embodiments of this application are also applicable to similar technical problems as the network architecture evolves and a new service scenario emerges.

FIG. 1 is a schematic structural diagram of an exemplary radio access network (RAN) according to an exemplary embodiment of this application. The RAN may be a base station access system of a 2G network (to be specific, the RAN includes a base station and a base station controller), may be a base station access system of a 3G network (to be specific, the RAN includes a base station and an RNC), may be a base station access system of a 4G network (to be specific, the RAN includes an eNB and an RNC), or may be a base station access system of a 5G network.

The RAN includes one network device or a plurality of network devices. The network device may be any device with a wireless transceiver function, or a chip disposed in a device with a wireless transceiver function. The network device includes but is not limited to a base station (for example, a BS, a NodeB, an evolved NodeB eNodeB or eNB, a gNodeB gNodeB or gNB in a fifth generation 5G communications system, a base station in a future communications system, an access node in a Wi-Fi system, a wireless relay node, or a wireless backhaul node) and the like. The base station may be a macro base station, a micro base station, a pico base station, a small cell, a relay station, or the like. A plurality of base stations may support a network using the foregoing one or more technologies, or a future evolved network. The core network may support a network using the foregoing one or more technologies, or a future evolved network. The base station may include one or more co-site or non-co-site transmission reception points (TRP). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6, or may communicate with the terminal devices 1 to 6 through a relay station. The terminal devices 1 to 6 may support communication with a plurality of base stations using different technologies. For example, the terminal devices may support communication with a base station supporting an LTE network, may support communication with a base station supporting a 5G network, or may support a dual connection to a base station in an LTE network and a base station in a 5G network. For example, the terminals are connected to a RAN node of a wireless network. Currently, some examples of the RAN node are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 each are also referred to as user equipment (UE), a mobile station (MS), a mobile terminal (MT), a terminal, or the like, and each are a device that provides voice and/or data connectivity for a user, or a chip disposed in the device, for example, a handheld device or a vehicle-mounted device with a wireless connection function. Currently, for example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, or a wireless terminal in a smart home. The terminal device provided in this embodiment of this application may be a low-complexity terminal device and/or a terminal device in a coverage enhancement mode A.

In this embodiment of this application, the base station and the UE 1 to the UE 6 form a communications system. In the communications system, the base station sends one or more of system information, a RAR message, or a paging message to one or more of the UE 1 to the UE 6. In addition, the UE 4 to the UE 6 also form a communications system. In the communications system, the UE 5 may function as a base station, and the UE 5 may send one or more of system information, control information, or a paging message to one or both of the UE 4 and the UE 6.

To resolve a prior-art problem that a terminal device cannot update a TA, in the embodiments of this application, a terminal device may autonomously monitor a parameter of the terminal device or monitor a downlink signal sent by a network device, so that the terminal device can generate a first variation based on a monitoring result, and determine, depending on whether the first variation meets a preset TA update condition, whether to send an uplink signal. When the terminal device sends the uplink signal, the network device may receive the uplink signal and perform measurement, to determine whether to generate TA information. If the network device generates the TA information, the network device sends the TA information. In this case, the terminal device may receive the TA information, and adjust an uplink transmission time based on the TA information. The uplink signal transmission method provided in the embodiments of this application is applicable to a terminal device in a connected state, or is applicable to a terminal device in an idle state. This resolves a prior-art problem of a hysteresis that may be caused by adjusting a TA when a timer expires. In the embodiments of this application, the first variation is generated based on the monitoring result of the terminal device, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

Figure 2:
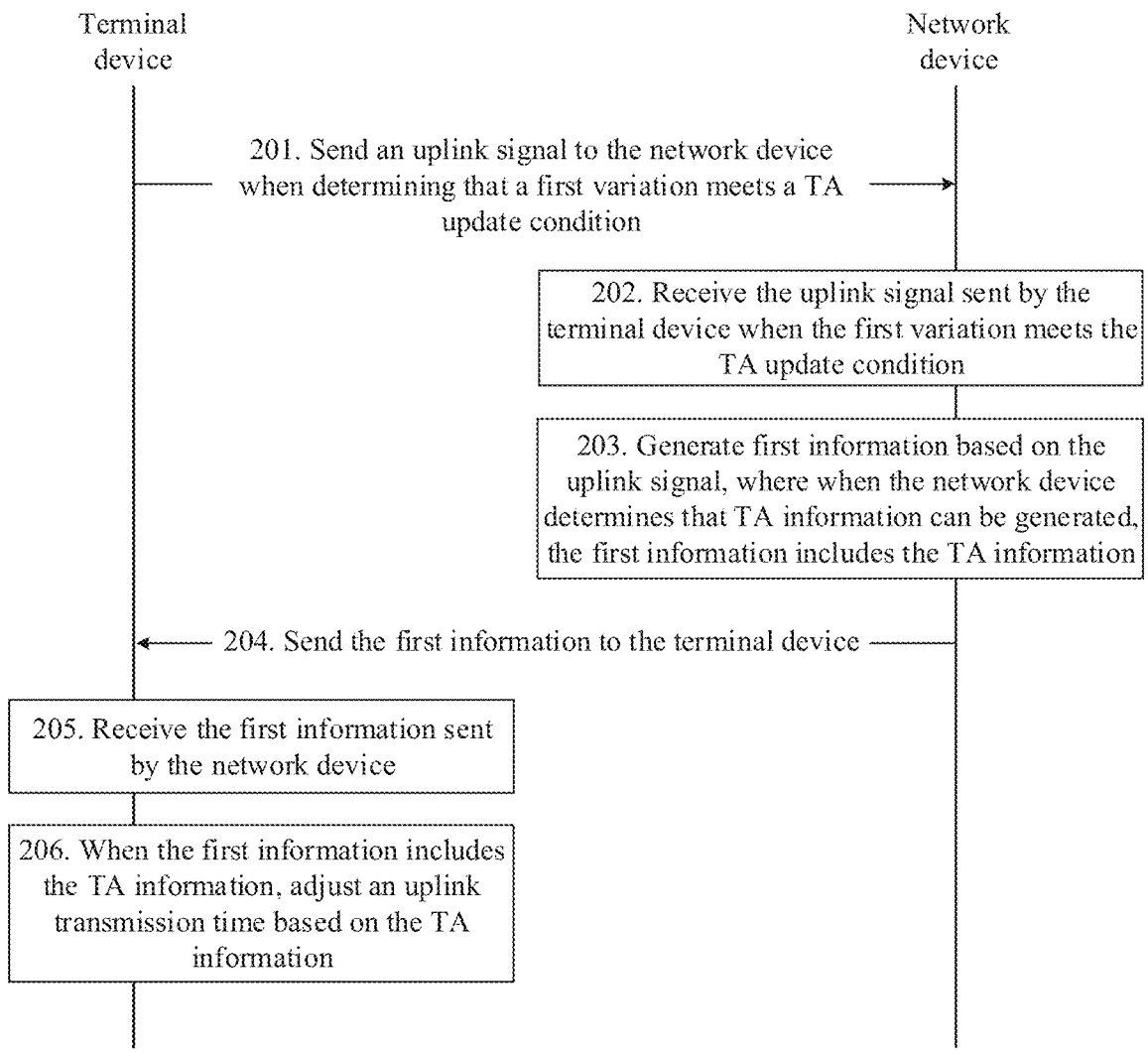
FIG. 2 is a schematic flowchart of interaction between a network device and a terminal device according to an exemplary embodiment of this application.

An embodiment of this application provides an uplink signal transmission method, and the method is applicable to an automatic uplink transmission time update scenario. FIG. 2 is a schematic flowchart of interaction between a network device and a terminal device according to an exemplary embodiment of this application. The uplink signal transmission method provided in this embodiment of this application mainly includes the following steps.

At step 201, the terminal device sends an uplink signal to the network device when the terminal device determines that a first variation meets a TA update condition.

The first variation is used to indicate a quality change value of a downlink signal received by the terminal device, a strength change value of the downlink signal, and/or a location change value of the terminal device.

In this embodiment of this application, the terminal device may autonomously monitor a parameter of the terminal device or monitor the downlink signal sent by the network device. The terminal device may detect a location change of the terminal device. For example, the terminal device measures the location change of the terminal device based on a global positioning system or a wireless network positioning system. Alternatively, the terminal device receives the downlink signal sent by the network device, and monitors a change of the downlink signal sent by the network device. The change of the downlink signal may include a quality change of the downlink signal or a strength change of the downlink signal. The terminal device may generate the first variation based on a monitoring result, and determine, depending on whether the first variation meets the preset TA update condition, whether to send the uplink signal. The TA update condition is a condition for determining whether a TA value of the terminal device needs to be updated, and the TA update condition includes at least one threshold used to be compared with the first variation.

In this embodiment of this application, the terminal device may generate the first variation based on the monitoring result. The first variation may be implemented in a plurality of manners. For example, the first variation may be used to indicate the quality change value of the downlink signal received by the terminal device, that is, the first variation may be generated by detecting a quality change of the downlink signal sent by the network device within a period of time, and/or the first variation may be used to indicate the strength change value of the downlink signal, that is, the first variation may be generated by detecting a strength change of the downlink signal sent by the network device within a period of time, and/or the first variation may be used to indicate the location change value of the terminal device, that is, the first variation may be generated by detecting a location change of the terminal device within a period of time. In this embodiment of this application, the terminal device may generate the first variation during the quality change of the downlink signal, the strength change of the downlink signal, and/or the location change of the terminal device. The quality change of the downlink signal, the strength change of the downlink signal, and/or the location change of the terminal device are/is related to an uplink transmission delay. In this case, the terminal device may generate the first variation, and then perform determining by using the preset TA update condition and the first variation, to determine whether to send the uplink signal, where the uplink signal may be an uplink signal used for TA update.

In some embodiments of this application, the first variation may be the strength change value of the downlink signal. The strength change value of the downlink signal includes a change value of reference signal received power (RSRP) of the terminal device. When the network device sends the downlink signal to the terminal device, the terminal device may detect the RSRP within a period of time, and determine the change value of the RSRP as the strength change value of the downlink signal. In an actual application, in addition to using the change value of the RSRP as the strength change value of the downlink signal, a value of the RSRP may further be calculated, for example, calculated by using an equivalent or variant formula, to obtain a result as the strength change value of the downlink signal. Alternatively, the first variation may be the quality change value of the downlink signal. The quality change value of the downlink signal includes a change value of reference signal received quality (RSRQ) of the terminal device. When the network device sends the downlink signal to the terminal device, the terminal device may detect the RSRQ within a period of time, and determine the change value of the RSRQ as the quality change value of the downlink signal. In an actual application, in addition to using the change value of the RSRQ as the quality change value of the downlink signal, a value of the RSRQ may further be calculated, for example, calculated by using an equivalent or variant formula, to obtain a result as the quality change value of the downlink signal.

In some embodiments of this application, the terminal device sends the uplink signal to the network device when the first variation meets the TA update condition. To enable the network device to identify each terminal device that sends an uplink signal, different terminal devices may send different uplink signals. In this way, the network device can identify different terminal devices based on received uplink signals. Alternatively, different terminal devices may send uplink signals by using different time-frequency resources, so that the network device can identify different terminal devices based on time-frequency resources used to receive uplink signals. An uplink signal sent by a terminal device is user-specific, includes an identity of the terminal device, or is scrambled by a user identity. The network device may determine the identity of the terminal device based on the received uplink signal. The identity of the terminal device may be a system architecture evolution-temporary mobile subscriber identity (S-TMSI), an international mobile subscriber identity (IMSI), or a cell radio network temporary identifier (C-RNTI).

In some embodiments of this application, that the terminal device determines that a first variation meets a TA update condition includes: the terminal device determines the first variation is greater than a first threshold and the first variation is less than a second threshold, where the first threshold is less than the second threshold. The TA update condition is: the first variation is greater than the first threshold, and the first variation is less than the second threshold. Therefore, after generating the first variation, the terminal device compares a value of the first variation with the first threshold and the second threshold. The first threshold and the second threshold are two different thresholds, and values of the first threshold and the second threshold may be determined according to an actual communication transmission scenario. For example, the values of the first threshold and the second threshold are both affected by the following factors: a condition of a channel between the terminal device and the network device, a size of a cyclic prefix (CP) of an orthogonal frequency division multiplexing (OFDM) symbol, and a validity range of the TA value. For example, the first threshold and the second threshold may be determined based on at least one of the foregoing factors. In addition, a relationship between the values of the first threshold and the second threshold is also determined based on the foregoing factors, and specifically depends on an application scenario.

For example, the first threshold and the second threshold may be determined based on a channel condition and a length of a CP. For example, a TA variation corresponding to the first threshold may be 0.1 CP, and a TA variation corresponding to the second threshold may be 0.6 CP or 0.9 CP. A length of a normal CP is 4.69 microseconds ($\mu$s). For example, when an uplink delay changes by 0.1 CP, that is, when the uplink delay changes by 0.469 $\mu$s, a distance change is approximately 140.7 meters (m), and a received power change is approximately 79 dB, that is, the first threshold is 79 dB. When an uplink delay changes by 0.4 CP, that is, changes by 1.876 $\mu$s, a distance change is approximately 562.8 m, and a received power change is approximately 101.8 dB, that is, the second threshold is 101.8 dB. A difference between the first threshold and the second threshold is approximately 20 dB, that is, 100 times.

In the foregoing embodiment of this application, when the terminal device determines that the first variation is less than or equal to the first threshold, the terminal device may not send the uplink signal used for TA update. When it is determined that the first variation is greater than the first threshold and less than the second threshold, it indicates that quality or strength of the downlink signal changes relatively slightly or that a user location does not change much. In this case, the terminal device may send the uplink signal to update a TA, where the uplink signal is user-specific, carries a user identity, or is scrambled by a user identity. Therefore, the network device may complete TA update without initiating a random access procedure, to ensure TA validity and avoid interference to other users.

When the terminal device determines that the first variation is greater than the first threshold and less than the second threshold, that the terminal device sends an uplink signal to the network device includes: the terminal device sends a reference signal to the network device. For example, the terminal device may send a demodulation reference signal (DMRS) to the network device, or the terminal device may send a sounding reference signal (SRS) to the network device. That the terminal device sends a DMRS is used as an example. When the terminal device is in an idle state, time-frequency resources allocated by the network device to different terminal devices may be the same, or may be different. However, DMRSs of different terminal devices need to be orthogonal, for example, may be distinguished by using time-frequency resources, cyclic shifts, or root sequences, and the DMRSs are user-specific. Therefore, the network device may distinguish between different terminal devices by using detected DMRSs. When the first variation is between the first threshold and the second threshold, the terminal device may send a DMRS, and the network device performs uplink synchronization measurement based on the received DMRS, to obtain the TA information.

In some embodiments of this application, the terminal device sends the uplink signal to the network device when the terminal device determines that the first variation meets the TA update condition. The uplink signal may be a signal with a relatively long CP. For example, when the terminal device determines that the first variation is greater than the second threshold, the terminal device sends a random access request to the network device. The random access request carries a preamble, and the preamble may include a preamble sequence and/or a time-frequency resource for transmitting the preamble sequence. The preamble sequence and/or the time-frequency resource that are/is used in the random access request may be determined by the terminal device based on a configuration of the network device, or the preamble sequence and/or the time-frequency resource that are/is used in the random access request may be configured by the network device for the terminal device, and the preamble sequence is not shared with another user on a same time-frequency resource. Therefore, different users can be distinguished.

When it is determined that the first variation is greater than the second threshold, it indicates that the quality or the strength of the downlink signal changes relatively greatly, or the user location changes relatively greatly. In this case, the terminal device may send the random access request to the network device, and the terminal device initiates random access to the network device to update the TA value, so that the terminal device obtains a valid TA value, and interference to other users caused by an inappropriate TA value is effectively avoided.

It should be noted that the preamble sequence and/or the time-frequency resource of the random access request sent by the terminal device may be selected by the terminal device from random access resources configured by the network device, or the preamble sequence and/or the time-frequency resource of the random access request may be a dedicated preamble sequence and/or time-frequency resource configured by the network device for the terminal device (in other words, the terminal device no longer needs to select, from a plurality of preamble sequences and/or time-frequency resources configured by the network device, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence is configured by the network device, and is not randomly selected by the terminal device, and a preamble sequence configured by the network is not shared with another user on a same time-frequency resource. Therefore, different users can be distinguished. The network device allocates a preamble to the terminal device for non-contention-based access, so that the terminal device can quickly complete random access.

In some embodiments of this application, the random access request initiated by the terminal device may be a contention-based random access request, or may be a non-contention-based random access request. A preamble of the non-contention-based random access request is a specific preamble configured by the network device for the terminal device, and the preamble configured by the network device may include a time resource and/or a frequency resource for sending the preamble, and/or a random access sequence.

In the foregoing embodiment of this application, when it is determined that the first variation is greater than the first threshold and less than the second threshold, it indicates that quality or strength of the downlink signal changes relatively slightly or that a user location does not change much. In this case, the terminal device may send the DMRS or send the SRS to update a TA. Because the TA value changes slightly, there is no interference to other users. Therefore, the uplink transmission time can be quickly adjusted by using a reference signal such as a DMRS. When it is determined that the first variation is greater than the second threshold, it indicates that the quality or the strength of the downlink signal changes relatively greatly, or the user location changes relatively greatly. If the terminal device further sends a DMRS, relatively strong interference is caused to other users. Therefore, a TA value needs to be changed by transmitting a preamble. In this case, the terminal device may send the random access request to the network device, so that the terminal device obtains a valid TA value, and interference to other users caused by an inappropriate TA value is effectively avoided.

In some embodiments of this application, the TA update condition is set to be that the first variation is greater than the first threshold and less than the second threshold. The TA update condition may alternatively be set to be that the first variation is greater than the third threshold. The third threshold may be a threshold different from the first threshold and the second threshold. A value of the third threshold may be determined based on an actual communication transmission scenario. For example, the value of the third threshold is affected by the following factors: a condition of a channel between the terminal device and the network device, a size of a CP of an OFDM symbol, and a validity range of the TA value. In an exemplary implementation, the third threshold may be set to a threshold greater than the first threshold and less than the second threshold.

In the TA update condition, one threshold (namely, the third threshold) may be used to determine whether the first variation meets the TA update condition. For example, that the terminal device sends an uplink signal to the network device when the terminal device determines that a first variation meets a TA update condition includes:

When the terminal device determines that the first variation is greater than a third threshold, the terminal device sends a DMRS to the network device, or the terminal device sends a random access request to the network device.

When the terminal device determines that the first variation is greater than the third threshold, it indicates that quality or strength of the downlink signal has changed greatly, or a location of the terminal device may change relatively significantly. The terminal device may send the DMRS or the random access request, so that the network device may receive the DMRS or the random access request. The network device identifies the terminal device by using the DMRS or the random access request, and the network device may send the TA information to the terminal device. In this way, the terminal device can update a TA value, to ensure validity of the TA value, avoid interference to other users, and further, can effectively reduce power consumption of a user and reduce a TA obtaining delay of the user.

It should be noted that the preamble sequence and/or the time-frequency resource of the random access request sent by the terminal device may be selected by the terminal device from random access resources configured by the network device, or the preamble sequence and/or the time-frequency resource of the random access request may be a dedicated preamble sequence and/or time-frequency resource configured by the network device for the terminal device (in other words, the terminal device no longer needs to select, from a plurality of preamble sequences and/or time-frequency resources configured by a network, a preamble sequence and/or a time-frequency resource that need/needs to be used by the terminal device). The preamble sequence and/or the time-frequency resource configured by the network device may also be referred to as a preamble sequence and/or a time-frequency resource in a non-contention-based random access process. Essentially, the preamble sequence and/or the time-frequency resource is configured by the network device, and is not randomly selected by the terminal device, and a preamble sequence configured by the network is not shared with another user on a same time-frequency resource. Therefore, different users can be distinguished. The network device allocates a preamble to the terminal device for non-contention-based access, so that the terminal device can quickly complete random access.

In some embodiments of this application, the terminal device may set a timer for TA update when the terminal device is in a connected state or in an idle state. When determining that the first variation meets the TA update condition, the terminal device performs step 201. When the terminal device determines that the first variation does not meet the TA update condition, and determines that the timer configured by the terminal device expires, the uplink signal transmission method provided in this embodiment of this application may further include the following step: the terminal device sends a DMRS to the network device, or the terminal device sends, to the network device, a random access request that carries a first preamble, where the first preamble may be a preamble configured by the network device.

The random access request carrying the first preamble is a preamble of a non-contention-based random access procedure, and the first preamble is configured by the network device for the terminal device. The preamble configured by the network device is a specific preamble configured by the network device for the terminal device, and the preamble is not shared with another terminal device on a same time-frequency resource. When the timer of the terminal device expires, it indicates that the TA value of the terminal device may have become invalid. In this case, the terminal device may send the DMRS or the random access request to the network device, so that the terminal device obtains a valid TA value, and interference to other users caused by an inappropriate TA value is effectively avoided.

At step 202, the network device receives the uplink signal sent by the terminal device when the first variation meets the TA update condition.

In this embodiment of this application, the terminal device sends the uplink signal to the network device when the first variation meets the TA update condition, and the network device may receive the uplink signal sent by the terminal device, and measure the uplink signal.

In some embodiments of this application, that the network device receives the uplink signal sent by the terminal device when the first variation meets the TA update condition includes:

The network device receives the DMRS sent by the terminal device.

Alternatively, the network device receives the random access request sent by the terminal device.

In some embodiments of this application, the terminal device sends the DMRS to the network device when determining that the first variation is less than or equal to the first threshold. The network device receives the DMRS from the terminal device, and the network device determines, based on the DMRS, the terminal device that sends the DMRS. When the terminal device determines that the first variation is greater than the second threshold, the terminal device sends the random access request to the network device, and the network device may receive the random access request sent by the terminal device. In some other embodiments of this application, when the terminal device determines that the first variation is greater than the third threshold, the terminal device sends the DMRS to the network device. The network device may receive the DMRS from the terminal device, and the network device determines, based on the DMRS, the terminal device that sends the DMRS. When the terminal device determines that the first variation is greater than the third threshold, the terminal device sends the random access request to the network device, and the network device may receive the random access request sent by the terminal device.

At step 203, network device generates first information based on the uplink signal. When the network device determines that the TA information can be generated, the first information includes the TA information, and the TA information is used to indicate the terminal device to adjust the uplink transmission time.

In this embodiment of this application, the network device may receive the uplink signal, and perform uplink synchronization measurement. The network device generates the first information based on the received uplink signal. When interference between the network device and the terminal device is relatively weak, the network device may generate the TA information after measuring the uplink signal, where the TA information is used to indicate the terminal device to adjust the uplink transmission time. For example, the TA information may be an adjusted TA value. After receiving the adjusted TA value, the terminal device needs to update an original TA value to the adjusted TA value. Alternatively, the TA information may be a TA change value. After receiving the TA change value, the terminal device updates an original TA value based on the TA change value.

In some embodiments of this application, if interference between the network device and the terminal device is relatively strong, the network device may not generate the TA information. When the network device determines that the network device cannot generate the TA information, the first information generated by the network device includes indication information. The indication information is used to indicate that the terminal device does not send the uplink data signal on the resource preconfigured by the network device. That is, the preconfigured resource cannot be used to send the uplink data signal, to avoid interference to other terminal devices. The resource preconfigured by the network device is a predefined resource. That is, communication is directly performed without dynamic downlink control information (DCI) scheduling. Therefore, the sending is also referred to as grant-free (GF) transmission or transmission on a predefined resource. The essence is that dynamic DCI scheduling is not required, and transmission is directly performed on the predefined resource. When the terminal device is in a connected state or in an idle state, the terminal device may perform grant-free transmission by using the preconfigured resource. In the grant-free transmission, a time-frequency resource is predefined, so that a user can directly transmit data on the predefined time-frequency resource when a data packet arrives. When the interference between the network device and the terminal device is relatively strong, the terminal device may not send, according to an indication of the network device, the uplink data signal on the resource preconfigured by the network device, to avoid interference to other terminal devices.

In some embodiments of this application, if interference between the network device and the terminal device is relatively strong, the network device may not generate the TA information. When the network device determines that the network device cannot generate the TA information, the first information generated by the network device includes indication information. The indication information is used to indicate the terminal device to send a random access request, or indicate the terminal device to send an uplink data signal in an early data transmission manner.

If the network device cannot obtain the TA value through measurement due to a factor such as interference, the network device may send indication information, to indicate the terminal device to avoid interference. For example, based on the indication information of the network device, the terminal device may initiate the random access request, or send the uplink data signal in the early data transmission manner. The random access request is a random access request in a non-early data transmission manner. A preamble of the random access request may be determined by the terminal device based on a configuration of the network device, or a preamble used for the random access request may be configured by the network device for the terminal device, and the preamble is not shared with another user on a same time-frequency resource. Therefore, different users can be distinguished. The random access resource is not associated with early data transmission, and a message 3 does not carry uplink data of a user. In an early data transmission manner, a random access resource is associated with the early data transmission, and a message 3 carries uplink data of a user. If the network device indicates the terminal device to send a random access request or send an uplink data signal in the early data transmission manner, the terminal device does not need to send the uplink data signal on the resource preconfigured by the network device.

At step 204, the network device sends the first information to the terminal device.

In this embodiment of this application, after the network device generates the first information, the network device sends the first information to the terminal device. If the first information carries the TA information, the terminal device may obtain the TA information by parsing the first information. If the first information carries the foregoing indication information, the terminal device may obtain the indication information by parsing the first information.

For example, the first information may be sent by the network device via a timing advance command or a timing adjustment indication. In an actual application, the network device may alternatively send the first information by using dedicated signaling. This is not limited herein.

At step 205, the terminal device receives the first information sent by the network device.

In this embodiment of this application, after the network device sends the first information to the terminal device, the terminal device obtains the first information, and determines a subsequent execution action of the terminal device based on content carried in the first information. For example, when the first information carries the TA information, subsequent step 206 is triggered to be performed.

In some embodiments of this application, when the terminal device determines that the first variation is greater than the first threshold and the first variation is less than the second threshold, the terminal device may send a DMRS to the network device. After the network device receives the DMRS, when the network device generates the indication information, the uplink signal transmission method provided in this embodiment of this application further includes the following step:

determining, by the terminal device based on the indication information, that the terminal device does not send an uplink data signal on a resource preconfigured by the network device;

sending, by the terminal device, a random access request to the network device based on the indication information; or determining, by the terminal device based on the indication information, that the terminal device sends an uplink data signal in an early data transmission manner.

The indication information is used to indicate that the terminal device does not send the uplink data signal on the resource preconfigured by the network device. That is, the preconfigured resource cannot be used to send the uplink data signal, to avoid interference to other terminal devices. The resource preconfigured by the base station is a predefined resource. That is, communication is directly performed without dynamic DCI scheduling. The terminal device may not send, according to an indication of the network device, the uplink data signal on the resource preconfigured by the network device, to avoid interference to other terminal devices.

The indication information is used to indicate the terminal device to send a random access request, or indicate the terminal device to send an uplink data signal in an early data transmission manner. For example, based on the indication information of the network device, the terminal device may initiate the random access request, or send the uplink data signal in the early data transmission manner. The random access request is a random access request in a non-early data transmission manner. The random access resource is not associated with early data transmission, and a message 3 does not carry uplink data of a user. For a random access request in the early data transmission, a random access resource is associated with the early data transmission, and a message 3 carries uplink data of a user. If the network device indicates the terminal device to send a random access request or send an uplink data signal in the early data transmission manner, the terminal device does not need to send the uplink data signal on the resource preconfigured by the network device.

In some embodiments of this application, when the terminal device determines that the first variation is greater than the third threshold, the terminal device sends a DMRS to the network device, or the terminal device sends a random access request to the network device. After the network device receives the DMRS or the random access request, when the network device generates the indication information, the uplink signal transmission method provided in this embodiment of this application may further include the following step:

determining, by the terminal device based on the indication information, that the terminal device does not send an uplink data signal on a resource preconfigured by the network device.

The indication information is used to indicate that the terminal device does not send the uplink data signal on the resource preconfigured by the network device. That is, the preconfigured resource cannot be used to send the uplink data signal, to avoid interference to other terminal devices. The resource preconfigured by the base station is a predefined resource. That is, communication is directly performed without dynamic DCI scheduling. The terminal device may not send, according to an indication of the network device, the uplink data signal on the resource preconfigured by the network device, to avoid interference to other terminal devices.

At step 206, when the first information includes the TA information, the terminal device adjusts the uplink transmission time based on the TA information.

In this embodiment of this application, when the network device generates the TA information, the terminal device may parse out the TA information from the first information, and then adjust the uplink transmission time based on the TA information. The uplink transmission time may include a transmission time of a physical uplink control channel (PUCCH), a physical uplink shared channel (PUSCH), or an SRS.

For example, the TA information may be an 11-bit TA command, and the TA value is determined based on an index value of the TA command. For example, the TA value is calculated by using the following formula: $N_{TA}=T_A \times 16$, where 16 is a step of adjusting the TA value each time. For another example, the TA information may be a 6-bit TA command, indicating an adjustment value of a current TA value ($N_{TA, new}$) relative to an original TA value ($N_{TA, old}$). The TA value is determined based on an index value of the TA command: $N_{TA,new}=N_{TA,old}+(T_A-31)\times 16$.

It can be learned from the example description in this embodiment of this application in the foregoing embodiment that, when the terminal device determines that the first variation meets the TA update condition, the terminal device first sends the uplink signal to the network device, where the first variation is used to indicate the quality change value of the downlink signal received by the terminal device, the strength change value of the downlink signal, and/or the location change value of the terminal device. The terminal device receives the first information sent by the network device. When the first information includes the TA information, the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

Figure 3:
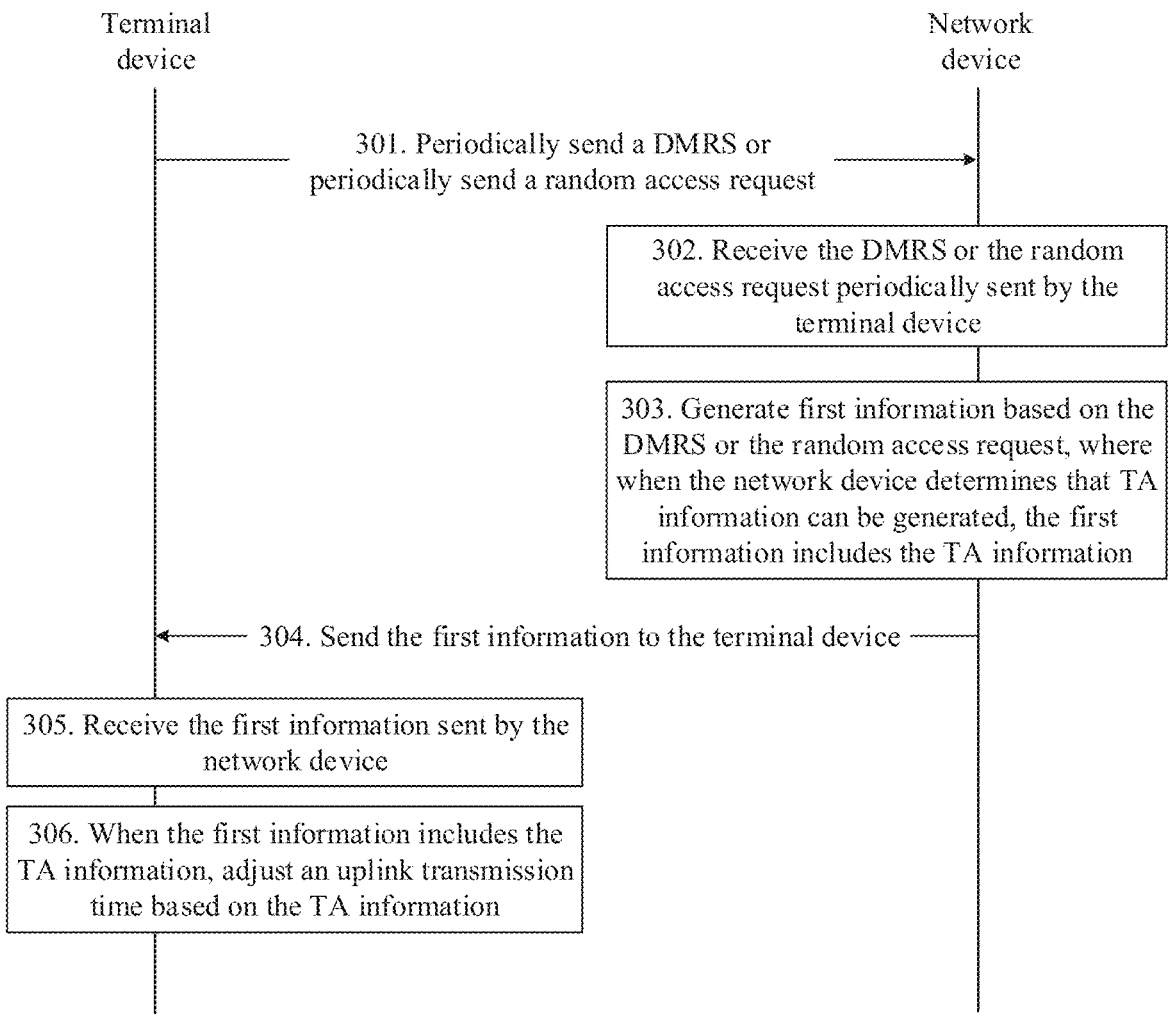
FIG. 3 is another schematic flowchart of interaction between a network device and a terminal device according to an exemplary embodiment of this application.

The foregoing embodiment describes the uplink signal transmission method provided in the embodiments of this application. The following describes another uplink signal transmission method provided in an embodiment of this application, and the method is applicable to an automatic uplink transmission time update scenario. FIG. 3 is another schematic flowchart of interaction between a network device and a terminal device according to an exemplary embodiment of this application. The uplink signal transmission method provided in this embodiment of this application mainly includes the following steps.

At step 301, the terminal device periodically sends a DMRS to the network device, or the terminal device periodically sends a random access request to the network device.

In this embodiment of this application, the terminal device sends the DMRS or the random access request to the network device by periodically sending an uplink signal. A value of a sending periodicity may be determined based on a specific scenario, for example, based on an actual communication transmission scenario. For example, the value of the periodicity is affected by the following factors: a size of an available resource, a feature of uplink data of a user, and/or mobility of the user.

The terminal device may periodically send the DMRS or the random access request, so that the network device may receive the DMRS or the random access request. The network device identifies the terminal device by using the DMRS or the random access request, and the network device may send TA information to the terminal device. In this way, the terminal device can update a TA value, to ensure validity of the TA value, avoid interference to other users, and further, can effectively reduce power consumption of a user and reduce a TA obtaining delay of the user.

In an exemplary implementation, the random access request includes a preamble configured by the network device.

A preamble of the random access request sent by the terminal device may be selected by the terminal device, or a preamble of the random access request may be the preamble configured by the network device. The preamble configured by the network device may also be referred to as a preamble in a non-contention-based random access procedure. Essentially, the preamble is configured by the network device, and is not randomly selected by the terminal device, and a preamble allocated by the network device to the terminal device is used for non-contention-based access, so that the terminal device can quickly complete random access.

In some embodiments of this application, the terminal device may set a timer for TA update when the terminal device is in a connected state or in an idle state. When determining that the first variation meets the TA update condition, the terminal device performs step 201. When the terminal device determines that the first variation does not meet the TA update condition, and determines that the timer configured by the terminal device expires, the uplink signal transmission method provided in this embodiment of this application may further include the following step: the terminal device sends a DMRS to the network device, or the terminal device sends, to the network device, a random access request that carries a first preamble, where the first preamble is a preamble configured by the network device for the terminal device.

At step 302, the network device receives the DMRS or the random access request periodically sent by the terminal device At step 303, the network device generates first information based on the DMRS or the random access request. When the network device determines that the timing advance TA information can be generated, the first information includes the TA information, and the TA information is used to indicate the terminal device to adjust an uplink transmission time.

At step 304, the network device sends the first information to the terminal device.

At step 305, the terminal device receives the first information sent by the network device.

At step 306, when the first information includes the TA information, the terminal device adjusts the uplink transmission time based on the TA information.

Step 303 to step 306 are similar to step 203 to step 206 in the foregoing embodiment. For details, refer to specific descriptions of sending the first information by the network device and adjusting the uplink transmission time by the terminal device in the foregoing embodiment. Details are not described herein again.

In an exemplary implementation, when the terminal device sends a DMRS, and the first information includes the TA information, step 306 is performed. When the first information includes indication information, the method provided in this embodiment of this application further includes the following steps:

sending, by the terminal device, a random access request to the network device based on the indication information.

The indication information is used to indicate the terminal device to send the random access request, and the terminal device may initiate the random access request based on the indication information of the network device.

It can be learned from the example description in this embodiment of this application in the foregoing embodiment that, the terminal device periodically sends the DMRS or the random access request to the network device, and the terminal device receives the first information sent by the network device. When the first information includes the TA information, the terminal device adjusts the uplink transmission time based on the TA information. In this embodiment of this application, the terminal device may periodically send the DMRS or the random access request, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

Figure 4:
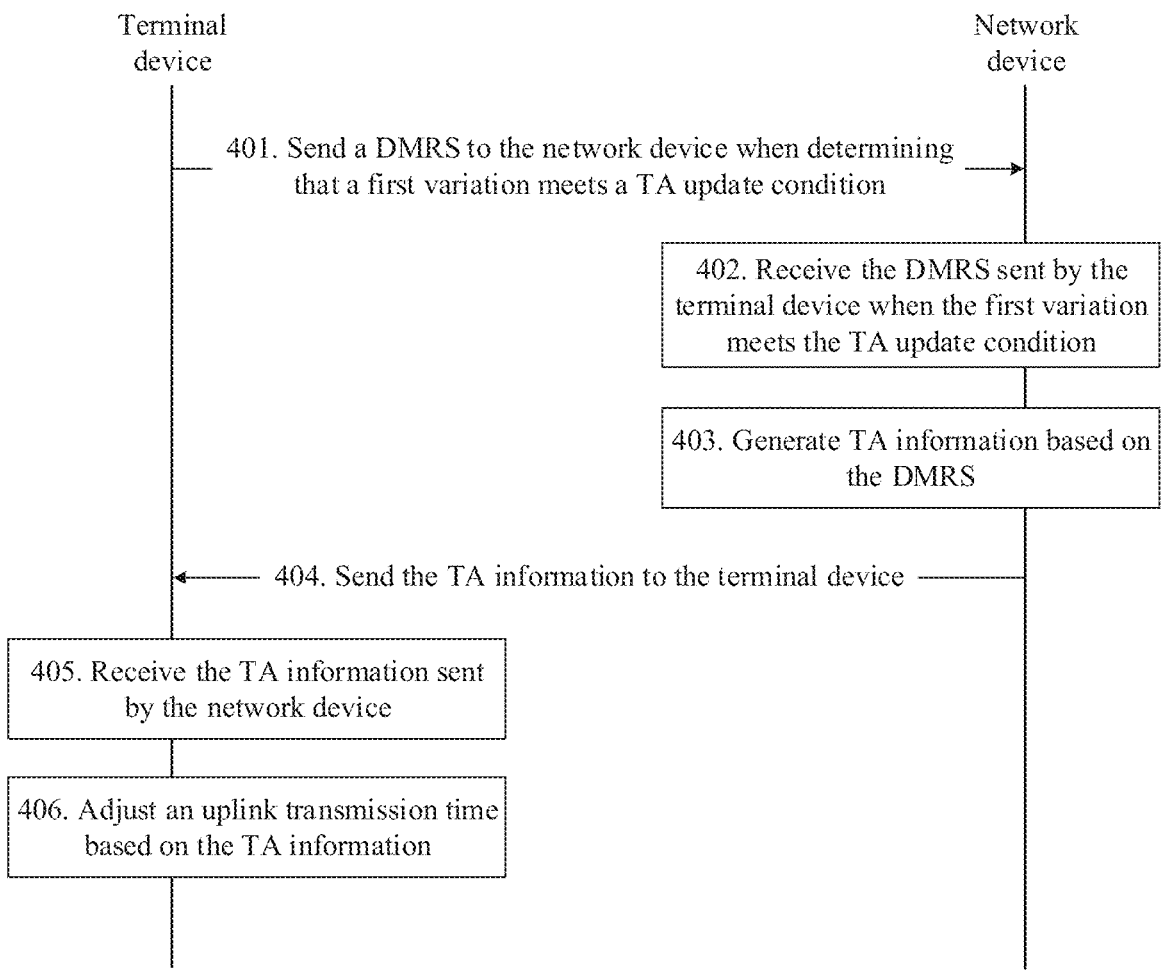
FIG. 4 is another schematic flowchart of interaction between a network device and a terminal device according to an exemplary embodiment of this application.

The foregoing embodiment describes the uplink signal transmission method provided in the embodiments of this application. The following describes another uplink signal transmission method provided in an embodiment of this application, and the method is applicable to an automatic uplink transmission time update scenario. FIG. 4 is another schematic flowchart of interaction between a network device and a terminal device according to an exemplary embodiment of this application. The uplink signal transmission method provided in this embodiment of this application mainly includes the following steps.

At step 401, the terminal device sends a demodulation reference signal (DMRS) to the network device when the terminal device determines that a first variation meets a TA update condition, where the first variation is used to indicate a quality change value of a downlink signal received by the terminal device, a strength change value of the downlink signal, and/or a location change value of the terminal device.

At step 402, the network device receives the demodulation reference signal (DMRS) sent by the terminal device when the first variation meets the TA update condition, where the first variation is used to indicate the quality change value of the downlink signal received by the terminal device, the strength change value of the downlink signal, and/or the location change value of the terminal device.

At step 403, the network device generates TA information based on the DMRS, where the TA information is used to indicate the terminal device to adjust an uplink transmission time.

At step 404, the network device sends the TA information to the terminal device.

At step 405, the terminal device receives the TA information sent by the network device.

At step 406, the terminal device adjusts the uplink transmission time based on the TA information.

It can be learned from the example description in this embodiment of this application in the foregoing embodiment that, when the terminal device determines that the first variation meets the TA update condition, the terminal device first sends the DMRS to the network device, where the first variation is used to indicate the quality change value of the downlink signal received by the terminal device, the strength change value of the downlink signal, and/or the location change value of the terminal device. The terminal device receives the TA information sent by the network device, and the terminal device adjusts the uplink transmission time based on the TA information. In this embodiment of this application, based on the first variation generated by the terminal device, when the first variation meets the TA update condition, the network device may be triggered in a timely manner to send the TA information, so that the terminal device can adjust the uplink transmission time in a timely manner. This ensures TA validity, avoids interference to other users, and further, can effectively reduce power consumption of a user and reduce a TA obtaining delay of the user.

Figure 5:
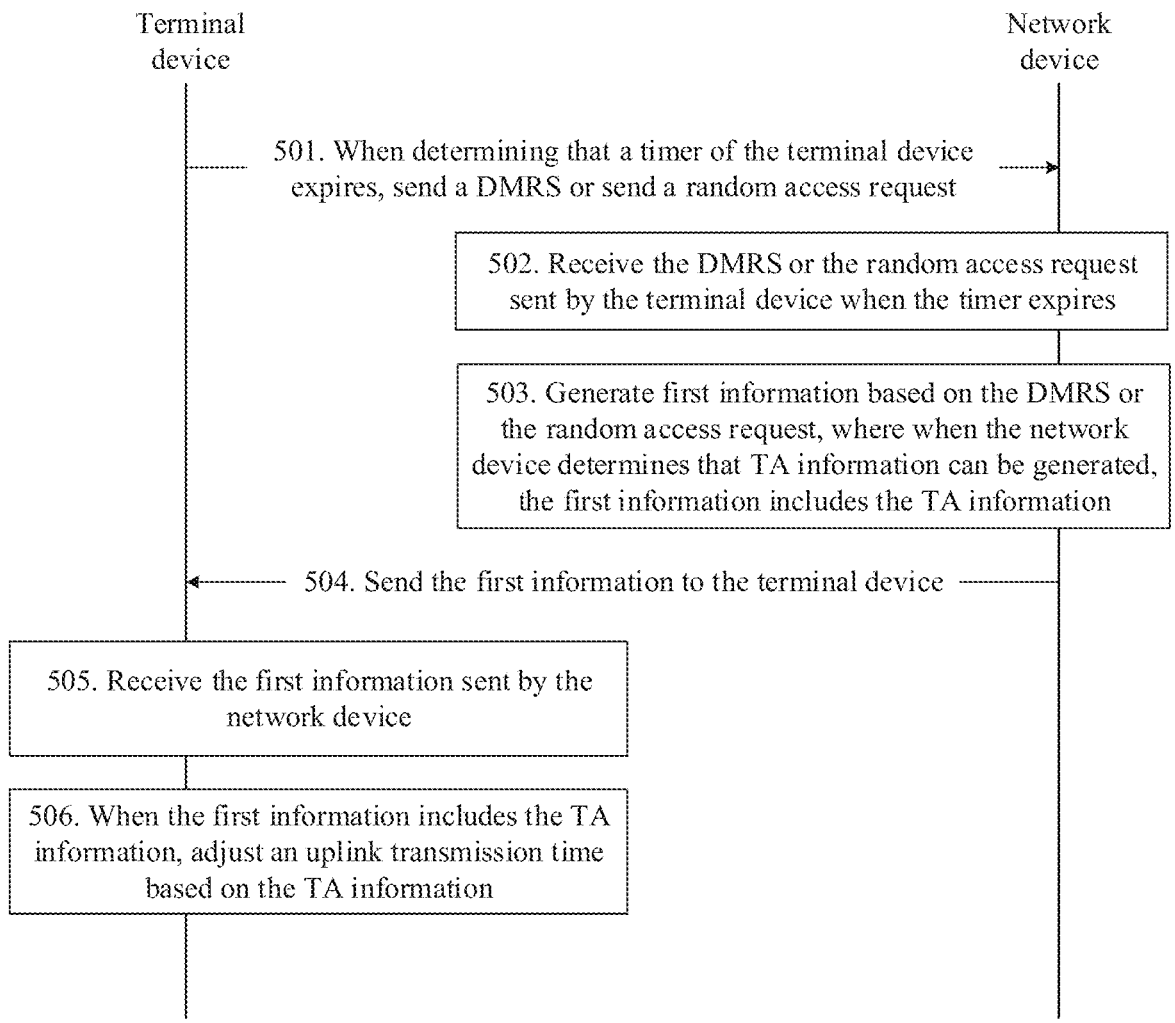
FIG. 5 is another schematic flowchart of interaction between a network device and a terminal device according to an exemplary embodiment of this application.

The foregoing embodiment describes the uplink signal transmission method provided in the embodiments of this application. The following describes another uplink signal transmission method provided in an embodiment of this application, and the method is applicable to an automatic uplink transmission time update scenario. FIG. 5 is another schematic flowchart of interaction between a network device and a terminal device according to an exemplary embodiment of this application. The uplink signal transmission method provided in this embodiment of this application mainly includes the following steps.

At step 501, when the terminal device determines that a timer of the terminal device expires, the terminal device sends a DMRS to the network device, or the terminal device sends a random access request to the network device.

At step 502, the network device receives the DMRS or the random access request sent by the terminal device when the timer expires.

At step 503, the network device generates first information based on the DMRS or the random access request. When the network device determines that timing advance TA information can be generated, the first information includes the TA information, and the TA information is used to indicate the terminal device to adjust an uplink transmission time.

At step 504, the network device sends the first information to the terminal device.

At step 505, the terminal device receives the first information sent by the network device.

At step 506, when the first information includes the timing advance TA information, the terminal device adjusts the uplink transmission time based on the TA information.

It can be learned from the example description in this embodiment of this application in the foregoing embodiment that, the terminal device sends the DMRS or the random access request to the network device when the timer expires, and the terminal device receives the first information sent by the network device. When the first information includes the TA information, the terminal device adjusts the uplink transmission time based on the TA information. In this embodiment of this application, the terminal device may send the DMRS or the random access request at a fixed time when the timer expires, so that the network device can be triggered in a timely manner to send the TA information, and the terminal device can adjust the uplink transmission time in a timely manner. This ensures TA validity, avoids interference to other users, and further, can effectively reduce power consumption of a user and reduce a TA obtaining delay of the user.

To better understand and implement the foregoing solutions in the embodiments of this application, the following uses a corresponding application scenario as an example for specific description.

In the embodiments of this application, factors that affect the TA include a signal transmission distance change caused by user movement, a multipath transmission distance change, and the like. These factors also cause a change in downlink RSRP. However, when the TA does not change much, that is, when the TA does not exceed a CP length of an OFDM symbol, a received signal of a user is not affected. For example, for an OFDM symbol of a 15 kHz subcarrier in LTE, other than the first symbol in each slot, a length of a CP of a symbol in the each slot is 4.69 μs, and a CP of the first symbol is longer than 4.69 μs. In other words, a distance change of 1407 m (4.69 μs×3×10^8) can be tolerated, where 10^8 indicates the eighth power of 10. In other words, for a normal CP, as long as a user location changes by less than 1407 m, a TA of a user is still valid although the TA is inaccurate. The TA becomes invalid when a distance changes greatly. If a distance change is great, RSRP changes sharply. However, the RSRP may change due to many factors. Therefore, specific distance change information may be obtained by observing an RSRP change amplitude.

In an idle state, if the TA needs to be updated, a random access procedure needs to be performed, a preamble is sent, and then an uplink TA is obtained through a random access response. Due to reasons such as contention, there are many steps for obtaining a TA, a delay is relatively long, and a large amount of power of a user is wasted.

It can be learned from the foregoing analysis that, to reduce power consumption of a user and simplify a random access procedure, the user may update, when a location of the user does not change greatly, a TA by sending an uplink signal that can reflect a user identity. When the location may change greatly, to prevent severe interference to other users, a random access procedure is rolled back to obtain a new TA. Rollback means that grant-free transmission is changed to a random access procedure or early data transmission. During transmission in an idle state, time-frequency resources allocated to different users may be the same or may be different, but DMRSs of different users need to be orthogonal, and need to be differentiated or scrambled by using time-frequency resources or cyclic shifts. Therefore, the DMRS is user-specific, and different users may be distinguished by using detected DMRSs. Therefore, when the location does not change much, the uplink DMRS may be sent to perform uplink synchronization measurement, to obtain a TA update amount. Change information of the user location may be estimated through, for example, an RSRP change or multi-cell radio resource management (RRM) measurement.

For example, the first variation is the change value of the RSRP. In a subsequent embodiment, the first threshold is S1, the second threshold is S2, and both S1 and S2 are thresholds. Factors affecting a value include a channel condition, a CP size, and a validity range of a TA. When the change value of the RSRP is greater than S1 but less than S2 (S1<S2), the user sends a DMRS. That is, when a change amplitude of the RSRP is slight, the user sends a DMRS for uplink synchronization measurement; when the change amplitude of the RSRP is greater than S2 or a timer for detecting validity of the TA expires, the user initiates a random access procedure to obtain a new TA.

In some embodiments of this application, the base station configures two thresholds S1 and S2 for the user or a protocol specifies two thresholds S1 and S2.

When a variation of an RSRP value measured by a user in a downlink within a period of time, a location change value obtained by a user within a period of time through RRM measurement, or another amount that can represent a location change of a user is greater than S1 and less than S2, the user sends an uplink DMRS or another uplink signal that can carry a user identity. The base station receives the uplink signal, performs uplink synchronization measurement, and sends a timing advance command or a timing adjustment indication to adjust an uplink transmission time of the user. The user receives the timing advance command or the timing adjustment indication, and adjusts the uplink transmission time, where the uplink transmission time includes a transmission time of a PUSCH/SRS/PUCCH. Alternatively, the base station sends signaling to indicate the user to deactivate or disable a preconfigured resource, that is, to indicate the user not to transmit an uplink signal on the preconfigured resource.

When a variation of an RSRP value measured by a user in a downlink direction within a period of time, a location change value obtained by a user within a period of time through RRM measurement, or another amount that can represent a location change of a user is greater than S2 or the timer expires, the user initiates a random access procedure or sends a preamble configured by the base station (which may also be referred to as a preamble in a non-contention-based random access procedure). The base station receives the preamble to perform uplink synchronization measurement, and sends a timing advance command or a timing adjustment indication to adjust an uplink transmission time of the user. The user receives the timing advance command or the timing adjustment indication, and adjusts the uplink transmission time, where the uplink transmission time includes a transmission time of a PUSCH/SRS/PUCCH. Alternatively, the UE receives indication information, and does not transmit an uplink signal on a configured resource or disable or deactivate a preconfigured resource. When the variation is less than S2, it indicates that the TA changes slightly and does not cause interference to other users. Therefore, the TA can be adjusted by using a reference signal such as a DMRS. When the variation is greater than S2, it indicates that the TA changes greatly. If a DMRS is further sent, relatively strong interference is caused to other users. Therefore, a TA value needs to be changed by transmitting a preamble.

Optionally, the DMRS may be different from a DMRS used when a user sends data. For example, the DMRSs are distinguished by using cyclic shifts, time resources, frequency resources, or orthogonal codes. The DMRS used to adjust the TA needs to be distinguished from the DMRS used to transmit data, and a distinguishing manner includes distinguishing using cyclic shifts and/or distinguishing through orthogonality of time-frequency resources.

A channel used by the base station to transmit the TA information or the indication information is not limited. For example, the TA information or the indication information may be transmitted by using a paging message or a DCI format 6-2.

According to the example descriptions in the foregoing embodiments, when the RSRP of the user changes slightly, that is, the user location changes slightly, the TA is updated by sending an uplink signal that can indicate the user identity. In this way, the base station may not need to initiate a random access procedure to update the TA. This ensures TA validity, avoids interference to other users, and further, can effectively reduce power consumption of a user and reduce a TA obtaining delay of the user. When the RSRP changes greatly, that is, the user location changes greatly, a random access procedure is initiated or a preamble configured by the base station is sent to update the TA, so that the user can obtain a valid TA, and interference to another users caused by an inappropriate TA is effectively avoided.

In some embodiments of this application, the base station configures the third threshold for the user or a protocol specifies the third threshold, and the third threshold is represented by a threshold S3.

When a variation of an RSRP value measured by a user in a downlink direction within a period of time, a location change value obtained by a user within a period of time through RRM measurement, or another amount that can represent a location change of a user is greater than S3 or the timer expires, the user sends, without dynamic DCI scheduling, an uplink DMRS to perform transmission on a preconfigured resource, or sends a preamble configured by the base station (which may also be referred to as a preamble in a non-contention-based random access procedure) or another uplink signal that can carry a user identity. The base station receives the uplink signal, performs uplink synchronization measurement, and sends a timing advance command or a timing adjustment indication to adjust an uplink transmission time of the user, or sends signaling to indicate the user to deactivate or disable a preconfigured resource, that is, to indicate the user not to transmit an uplink signal on the preconfigured resource. The user receives the timing advance command or the timing adjustment indication, and adjusts the uplink transmission time, where the uplink transmission time includes a transmission time of a PUSCH/SRS/PUCCH; or receives indication information, and does not transmit the uplink signal on the configured resource or disable or deactivate the preconfigured resource.

Optionally, the DMRS may be different from a DMRS used when the user sends data.

A channel used by the base station to transmit the TA information or the indication information is not limited. For example, the TA information or the indication information may be transmitted through paging or a DCI format 6-2.

It can be learned from the descriptions of the foregoing embodiments that, when the change value of the RSRP of the user exceeds a specific threshold, it indicates that the location of the user may change significantly, and the TA is updated by sending an uplink signal that can indicate the user identity. In this way, the base station may not need to initiate a random access procedure to update the TA. This ensures TA validity, avoids interference to other users, and further, can effectively reduce power consumption of a user and reduce a TA obtaining delay of the user.

In some embodiments of this application, the UE may first determine a periodicity value. The periodicity value is configured by the base station, and is related to a size of a resource pool and/or a feature of uplink data of a user and/or mobility of the user.

The UE periodically sends a DMRS, or sends a preamble (which may also be referred to as a preamble in a non-contention-based random access procedure) configured by the base station or another uplink signal that can carry a user identity. The base station receives the uplink signal, performs uplink synchronization measurement, and sends a timing advance command or a timing adjustment indication to adjust an uplink transmission time of the user, or sends signaling to indicate the user to deactivate or disable a preconfigured resource, that is, to indicate the user not to transmit an uplink signal on the preconfigured resource. The user receives the timing advance command or the timing adjustment indication, and adjusts the uplink transmission time, where the uplink transmission time includes a transmission time of a PUSCH/SRS/PUCCH; or receives indication information, and does not transmit the uplink signal on the configured resource or disable or deactivate the preconfigured resource.

Optionally, the DMRS may be different from a DMRS used when the user sends data.

A channel used by the base station to transmit the TA information or the indication information that is used for disabling is not limited. For example, the TA information or the indication information may be transmitted through paging or a DCI format 6-2.

It can be learned from the descriptions of the foregoing embodiments that the UE periodically sends the DMRS or sends the preamble configured by the base station, so that the base station can relatively accurately adjust the TA, rather than adjust the TA when the TA changes greatly. This ensures TA validity, avoids interference to other users, and further, can effectively reduce power consumption of a user and reduce a TA obtaining delay of the user.

It should be noted that, for brief description, the foregoing method embodiments are represented as a series of actions. However, a person skilled in the art should appreciate that this application is not limited to the described order of the actions, because according to this application, some steps may be performed in another order or simultaneously. It should be further appreciated by a person skilled in the art that the embodiments described in this specification all belong to embodiments, and the involved actions and modules are not necessarily required by this application.

To better implement the foregoing solutions in the embodiments of this application, the following further provides a related apparatus for implementing the foregoing solutions.

Figure 6:
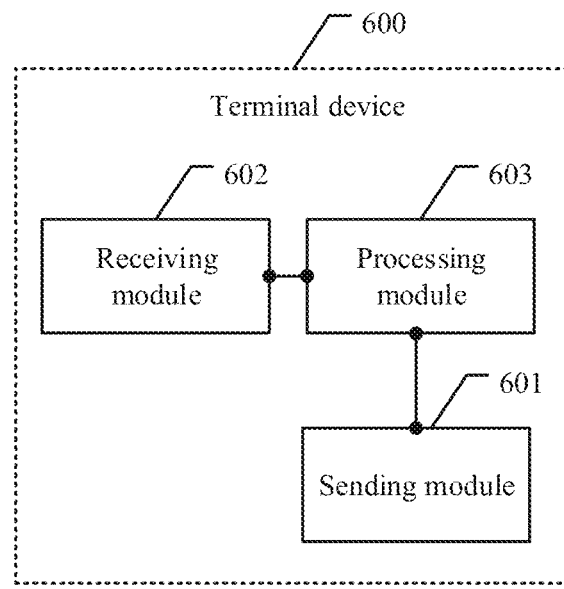
FIG. 6 is a schematic structural composition diagram of a terminal device according to an exemplary embodiment of this application.

FIG. 6 is a schematic structural composition diagram of a terminal device according to an exemplary embodiment of this application. The terminal device 600 may include:

a processing module 603, configured to send an uplink signal to a network device by using a sending module 601 when determining that a first variation meets a timing advance (TA) update condition, where the first variation is used to indicate a quality change value of a downlink signal received by the terminal device, a strength change value of the downlink signal, and/or a location change value of the terminal device; and a receiving module 602, configured to receive first information sent by the network device, where the processing module 603 is further configured to: when the first information includes TA information, adjust an uplink transmission time based on the TA information.

In some embodiments of this application, that a first variation meets a timing advance (TA) update condition includes: the first variation is greater than a first threshold and the first variation is less than a second threshold, where the first threshold is less than the second threshold.

In some embodiments of this application, the uplink signal is a demodulation reference signal (DMRS).

In some embodiments of this application, when the first information includes indication information, the processing module 603 is further configured to: determine, based on the indication information, that the terminal device does not send an uplink data signal on a resource preconfigured by the network device; send a random access request to the network device based on the indication information by using the sending module 601; or determine, based on the indication information, that the terminal device sends an uplink data signal by using the sending module 601 in an early data transmission manner.

In some embodiments of this application, the processing module 603 is further configured to send a random access request to the network device by using the sending module 601 when determining that the first variation is greater than the second threshold.

In some embodiments of this application, that a first variation meets a timing advance (TA) update condition includes that the first variation is greater than a third threshold.

The uplink signal is a DMRS or a random access request.

In some embodiments of this application, the processing module 603 is further configured to: when the first information includes indication information, determine, based on the indication information, that the terminal device does not send an uplink data signal on a resource preconfigured by the network device.

In some embodiments of this application, the processing module 603 is further configured to: when determining that the first variation does not meet the TA update condition and that a timer configured by the terminal device expires, send, by using the sending module, a DMRS to the network device, or send, to the network device by using the sending module, a random access request that carries a first preamble, where the first preamble is a preamble configured by the network device for the terminal device.

In some embodiments of this application, the strength change value of the downlink signal includes a change value of reference signal received power (RSRP) of the terminal device; and the quality change value of the downlink signal includes a change value of reference signal received quality (RSRQ) of the terminal device.

Figure 7:
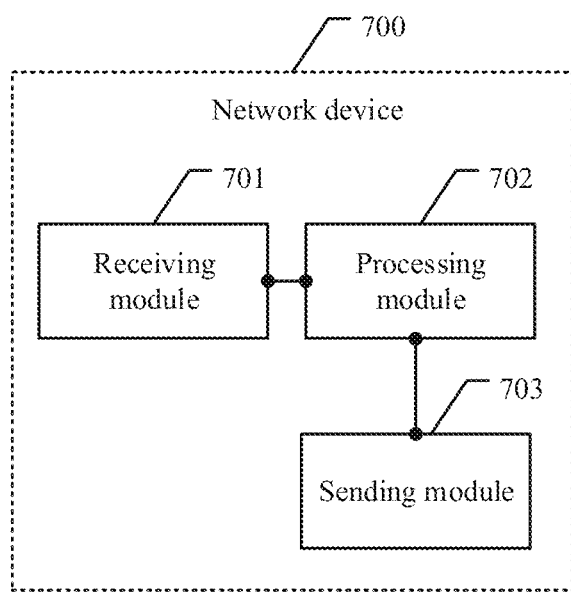
FIG. 7 is a schematic structural composition diagram of a network device according to an exemplary embodiment of this application.

FIG. 7 is a schematic structural composition diagram of a network device according to an exemplary embodiment of this application. The network device 700 may include:

a receiving module 701, configured to receive an uplink signal sent by a terminal device when a first variation meets a timing advance (TA) update condition, where the first variation is used to indicate a quality change value of a downlink signal received by the terminal device, a strength change value of the downlink signal, and/or a location change value of the terminal device;

a processing module 702, configured to generate first information based on the uplink signal, where when the processing module 702 determines that TA information can be generated, the first information includes the TA information, and the TA information is used to indicate the terminal device to adjust an uplink transmission time; and a sending module 703, configured to send the first information to a terminal device.

In some embodiments of this application, the receiving module 702 is configured to: receive a demodulation reference signal (DMRS) sent by the terminal device; or receive a random access request sent by the terminal device.

In some embodiments of this application, when the processing module determines that the TA information cannot be generated, the first information includes indication information, and the indication information is used to indicate the terminal device not to send an uplink data signal on a resource preconfigured by the network device, indicate the terminal device to send a random access request, or indicate the terminal device to send an uplink data signal in an early data transmission manner.

An embodiment of this application further provides a terminal device, including:
  a sending module, configured to periodically send a demodulation reference signal (DMRS) to a network device, or periodically send a random access request to a network device;
  a receiving module, configured to receive first information sent by the network device; and
  a processing module, configured to: when the first information includes timing advance TA information, adjust an uplink transmission time based on the TA information.

In an exemplary implementation, the random access request includes a preamble configured by the network device.

In an exemplary implementation, when the terminal device sends a DMRS, and the first information includes indication information, the sending module is further configured to send a random access request to the network device based on the indication information.

An embodiment of this application further provides a network device, including:
  a receiving module, configured to receive a demodulation reference signal (DMRS) or a random access request periodically sent by a terminal device;
  a processing module, configured to generate first information based on the DMRS or the random access request, where when it is determined that timing advance TA information can be generated, the first information includes the TA information, and the TA information is used to indicate the terminal device to adjust an uplink transmission time; and
  a sending module, configured to send the first information to the terminal device.

In an exemplary implementation, the random access request includes a preamble configured by the network device.

In an exemplary implementation, when the sending module sends a DMRS, the first information includes indication information, where the indication information is used to indicate the terminal device to send a random access request to the network device.

An embodiment of this application further provides a terminal device, including:
  a processing module, configured to send a demodulation reference signal (DMRS) to a network device by using a sending module when determining that a first variation meets a timing advance (TA) update condition, where the first variation is used to indicate a quality change value of a downlink signal received by the terminal device, a strength change value of the downlink signal, and/or a location change value of the terminal device; and
  a receiving module, configured to receive TA information sent by the network device.

The processing module is further configured to adjust an uplink transmission time based on the TA information.

An embodiment of this application further provides a network device, including:
  a receiving module, configured to receive a demodulation reference signal (DMRS) sent by a terminal device when a first variation meets a timing advance (TA) update condition, where the first variation is used to indicate a quality change value of a downlink signal received by the terminal device, a strength change value of the downlink signal, and/or a location change value of the terminal device;

a processing module, configured to generate TA information based on the DMRS, where the TA information is used to indicate the terminal device to adjust an uplink transmission time; and a sending module, configured to send the TA information to the terminal device.

An embodiment of this application further provides a terminal device, including:

a processing module, configured to: when determining that a timer of the terminal device expires, send, by using a sending module, a demodulation reference signal (DMRS) to a network device, or sending, by the terminal device, a random access request to a network device; and a receiving module, configured to receive first information sent by the network device.

The processing module is further configured to: when the first information includes timing advance TA information, adjust an uplink transmission time based on the TA information.

In an exemplary implementation, the random access request includes a preamble configured by the network device.

An embodiment of this application further provides a network device, including:

a receiving module, configured to receive a demodulation reference signal (DMRS) or a random access request sent by a terminal device when a timer expires;

a processing module, configured to generate first information based on the DMRS or the random access request, where when it is determined that timing advance TA information can be generated, the first information includes the TA information, and the TA information is used to indicate the terminal device to adjust an uplink transmission time; and a sending module, configured to send the first information to the terminal device.

In an exemplary implementation, the random access request includes a preamble configured by the network device.

In an exemplary implementation, when the terminal device sends a DMRS, the first information includes indication information, where the indication information is used to indicate the terminal device to send a random access request to the network device.

It should be noted that content such as information exchange between the modules/units of the apparatus and the execution processes thereof is based on the same idea as the method embodiments of this application, and produces the same technical effects as the method embodiments of this application. For the specific content, refer to the foregoing descriptions in the method embodiments of this application. Details are not described herein again.

An embodiment of this application further provides a computer storage medium. The computer storage medium stores a program. The program is executed to perform some or all of the steps described in the method embodiments.

Figure 8:
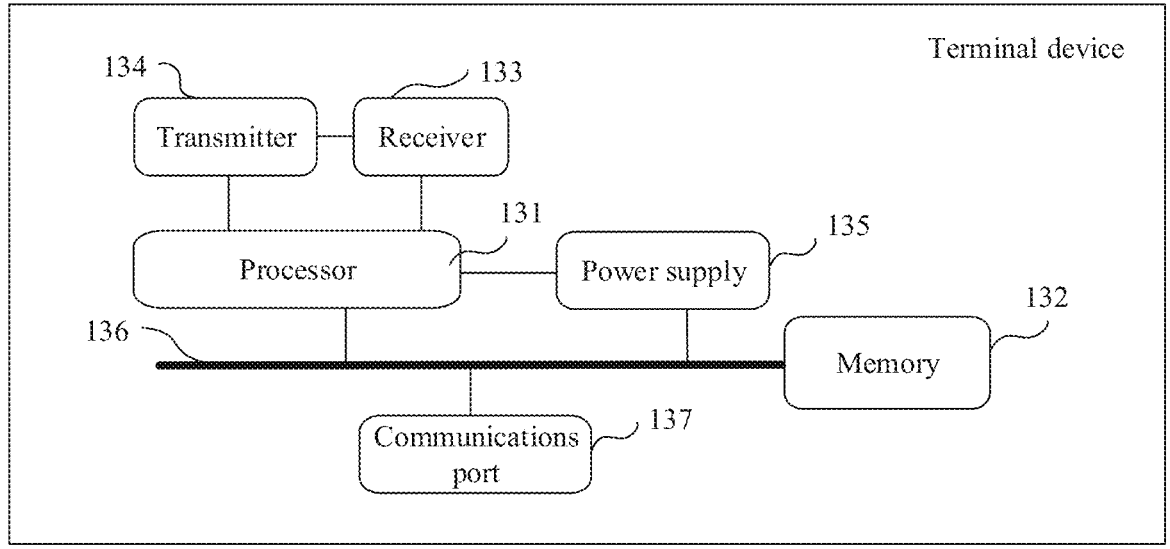
FIG. 8 is another schematic structural composition diagram of a terminal device according to an exemplary embodiment of this application.

FIG. 8 is a schematic structural diagram of another device according to an exemplary embodiment of this application. The device is a terminal device, and the terminal device may include a processor 131 (for example, a CPU), a memory 132, a transmitter 134, and a receiver 133. The transmitter 134 and the receiver 133 are coupled to the processor 131, and the processor 131 controls a sending action of the transmitter 134 and a receiving action of the receiver 133. The memory 132 may include a high-speed RAM memory, and may further include a nonvolatile memory NVM, for example, at least one magnetic disk memory. The memory 132 may store various instructions, to complete various processing functions and implement the method steps in the embodiments of this application. Optionally, the terminal device in this embodiment of this application may further include one or more of a power supply 135, a communications bus 136, and a communications port 137. The receiver 133 and the transmitter 134 may be integrated into a transceiver of the terminal device, or may be a receive antenna and a transmit antenna that are independent of each other on the terminal device. The communications bus 136 is configured to implement communication connections between the components. The communications port 137 is configured to implement connection and communication between the terminal device and another peripheral.

In this embodiment of this application, the memory 132 is configured to store computer-executable program code, and the program code includes an instruction. When the processor 131 executes the instruction, the instruction enables the processor 131 to perform a processing action of the terminal device in the foregoing method embodiments, and enables the transmitter 134 to perform a sending action of the terminal device in the foregoing method embodiments. Their implementation principles and technical effects are similar. Details are not described herein again.

Figure 9:
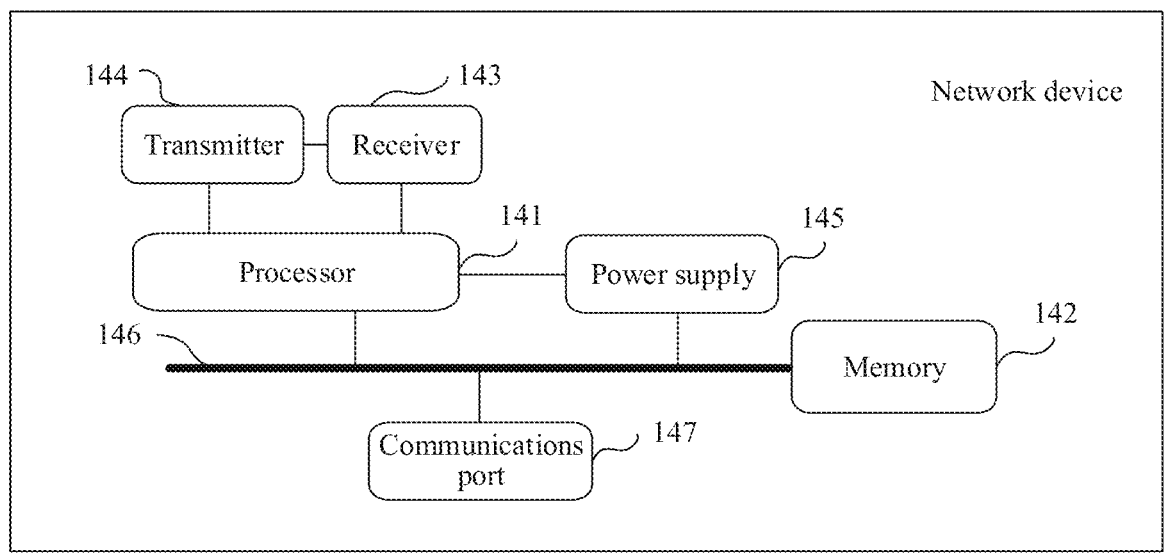
FIG. 9 is another schematic structural composition diagram of a network device according to an exemplary embodiment of this application.

FIG. 9 is a schematic structural diagram of another device according to an exemplary embodiment of this application. The device is a network device, and the network device may include a processor 141 (for example, a CPU), a memory 142, a receiver 143, and a transmitter 144. The receiver 143 and the transmitter 144 are coupled to the processor 141, and the processor 141 controls a receiving action of the receiver 143 and a sending action of the transmitter 144. The memory 142 may include a high-speed RAM memory, and may further include a nonvolatile memory NVM, for example, at least one magnetic disk memory. The memory 142 may store various instructions, to complete various processing functions and implement the method steps in the embodiments of this application. Optionally, the network device in this embodiment of this application may further include one or more of a power supply 145, a communications bus 146, and a communications port 147. The receiver 143 and the transmitter 144 may be integrated into a transceiver of the network device, or may be a receive antenna and a transmit antenna that are independent of each other on the network device. The communications bus 146 is configured to implement communication connections between the components. The communications port 147 is configured to implement connection and communication between the network device and another peripheral.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute computer-executable instructions stored in a storage unit, so that the chip in the terminal is enabled to perform the wireless communication method according to any one of the possible implementations of the first aspect. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

The processor mentioned above may be a general-purpose central processing unit (CPU), a microprocessor, an application-specific integrated circuit (ASIC), or one or more integrated circuits configured to control program execution of the wireless communication method in the first aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables. A person of ordinary skill in the art may understand and implement the embodiments of the present invention without creative efforts.

Based on the descriptions of the foregoing implementations, a person skilled in the art may clearly understand that this application may be implemented by software in addition to universal hardware, or by dedicated hardware, including a dedicated integrated circuit, a dedicated CPU, a dedicated memory, a dedicated component, and the like. Generally, any function that can be performed by a computer program can be easily implemented by corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedure or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. An uplink signal transmission method, the method comprising:
   sending, by a terminal device, an uplink signal to a network device in response to determining that a first variation meets a timing advance (TA) update condition, wherein the first variation indicates a strength change value of a downlink signal received by the terminal device;
   receiving, by the terminal device, first information from the network device;
   in response to determining that the first information comprises TA information, adjusting, by the terminal device, an uplink transmission time based on the TA information; and
   in response to determining that the first variation does not meet the TA update condition and that a timer configured by the terminal device expires, sending, by the terminal device to the network device, a random access request that carries a first preamble, wherein the first preamble is a preamble configured by the network device for the terminal device.

2. The method according to claim 1, wherein the sending, by the terminal device, the uplink signal to the network device comprises:
   in response to determining that the first variation is greater than a third threshold, sending, by the terminal device, the random access request to the network device.

3. The method according to claim 2, wherein the first information comprises indication information, the method further comprises:
   determining, by the terminal device based on the indication information, that the terminal device does not send an uplink data signal on a resource preconfigured by the network device.

4. The method according to claim 1, wherein the strength change value of the downlink signal comprises a change value of reference signal received power (RSRP) of the terminal device.

5. An uplink signal transmission method, the method comprising:
   receiving, by a network device, an uplink signal from a terminal device in response to determining that a first variation meets a timing advance (TA) update condition, wherein the first variation indicates a strength change value of a downlink signal received by the terminal device;
   generating, by the network device, first information based on the uplink signal, wherein in response to determining that TA information can be generated, the first information comprises the TA information, and the TA information indicates the terminal device to adjust an uplink transmission time;
   sending, by the network device, the first information to the terminal device; and
   receiving, by the network device, a random access request that carries a first preamble from the terminal device, wherein the first preamble is a preamble configured by the network device for the terminal device, and wherein the random access request is sent by the terminal device in response to determining that the first variation does not meet the TA update condition and that a timer configured by the terminal device expires.

6. The method according to claim 5, wherein the receiving, by the network device, the uplink signal from the terminal device comprises:
receiving, by the network device, the random access request from the terminal device.

7. The method according to claim 5, wherein in response to determining that the TA information cannot be generated, the first information comprises indication information, and the indication information indicates the terminal device not to send an uplink data signal on a resource preconfigured by the network device, indicates the terminal device to send the random access request, or indicates the terminal device to send an uplink data signal in an early data transmission manner.

8. The method according to claim 5, wherein the strength change value of the downlink signal comprises a change value of reference signal received power (RSRP) of the terminal device.

9. A terminal device, the device comprising:
at least one processor; and
one or more memories coupled to the at least one processor and storing programming instructions for execution by the at least one processor to:
send an uplink signal to a network device in response to determining that a first variation meets a timing advance (TA) update condition, wherein the first variation indicates a strength change value of a downlink signal received by the terminal device;
receive first information from the network device;
in response to determining that the first information comprises TA information, adjust an uplink transmission time based on the TA information; and
in response to determining that the first variation does not meet the TA update condition and that a timer configured by the terminal device expires, send, to the network device, a random access request that carries a first preamble, wherein the first preamble is a preamble configured by the network device for the terminal device.

10. The terminal device according to claim 9, wherein
that the first variation meets the timing advance (TA) update condition comprises that the first variation is greater than a third threshold; and
the uplink signal is a demodulation reference signal (DMRS) or the random access request.

11. The terminal device according to claim 10, wherein the programming instructions further cause the at least one processor to: in response to determining that the first information comprises indication information, determine, based on the indication information, that the terminal device does not send an uplink data signal on a resource preconfigured by the network device.

12. The terminal device according to claim 9, wherein the strength change value of the downlink signal comprises a change value of reference signal received power (RSRP) of the terminal device.

13. A network device, the device comprising:
at least one processor; and
one or more memories coupled to the at least one processor and storing programming instructions for execution by the at least one processor to:
receive an uplink signal from a terminal device in response to determining that a first variation meets a timing advance (TA) update condition, wherein the first variation indicates a strength change value of a downlink signal received by the terminal device;
generate first information based on the uplink signal, wherein in response to determining that TA information can be generated, the first information comprises the TA information, and the TA information indicates the terminal device to adjust an uplink transmission time;
send the first information to the terminal device; and
receive a random access request that carries a first preamble from the terminal device, wherein the first preamble is a preamble configured by the network device for the terminal device, and wherein the random access request is sent by the terminal device in response to determining that the first variation does not meet the TA update condition and that a timer configured by the terminal device expires.

14. The network device according to claim 13, wherein the programming instructions further cause the at least one processor to: receive the random access request from the terminal device.

15. The network device according to claim 13, wherein the programming instructions further cause the at least one processor to: in response to determining that the TA information cannot be generated, the first information comprises indication information, and the indication information indicates the terminal device not to send an uplink data signal on a resource preconfigured by the network device, indicates the terminal device to send the random access request, or indicates the terminal device to send an uplink data signal in an early data transmission manner.

16. The network device according to claim 13, wherein the strength change value of the downlink signal comprises a change value of reference signal received power (RSRP) of the terminal device.

* * * * *